(12) United States Patent
Welles et al.

(10) Patent No.: US 9,646,509 B2
(45) Date of Patent: May 9, 2017

(54) SYSTEM, METHOD AND APPARATUS FOR DRIVER TRAINING SYSTEM WITH STRESS MANAGEMENT

(71) Applicant: Advanced Training System LLC, St. Petersburg, FL (US)

(72) Inventors: Reginald T. Welles, Salt Lake City, UT (US); Darrell R. Turpin, Murray, UT (US); Aaron J. Turpin, Taylorsville, UT (US)

(73) Assignee: Advanced Training Systems LLC, St. Petersburg, FL (US)

( * ) Notice: Subject to any disclaimer, the term of this patent is extended or adjusted under 35 U.S.C. 154(b) by 0 days.

(21) Appl. No.: 13/944,563

(22) Filed: Jul. 17, 2013

(65) Prior Publication Data
US 2013/0302760 A1     Nov. 14, 2013

Related U.S. Application Data

(63) Continuation-in-part of application No. 12/889,448, filed on Sep. 24, 2010, now Pat. No. 8,770,980.

(60) Provisional application No. 61/277,768, filed on Sep. 29, 2009.

(51) Int. Cl.
    *G09B 9/04*      (2006.01)
    *G09B 9/05*      (2006.01)
    *G09B 9/052*     (2006.01)

(52) U.S. Cl.
    CPC ............... *G09B 9/05* (2013.01); *G09B 9/052* (2013.01)

(58) Field of Classification Search
CPC .. G09B 9/04; G09B 9/052; A61B 5/16; A61B 5/18
USPC .............. 434/29, 62, 65, 236; 340/576
See application file for complete search history.

(56) References Cited

U.S. PATENT DOCUMENTS

| | | | |
|---|---|---|---|
| 3,309,794 A | | 3/1967 | Greenshields |
| 3,479,750 A | | 11/1969 | Swanson |
| 3,583,079 A | | 6/1971 | Koci |
| 3,611,589 A | | 10/1971 | Wiltse |
| 3,896,564 A | | 7/1975 | Dewey et al. |
| 3,936,955 A | | 2/1976 | Gruen |
| 4,034,484 A | | 7/1977 | Radice |
| 4,464,117 A | | 8/1984 | Foerst |
| 4,683,891 A | * | 8/1987 | Cornellier et al. ........... 600/301 |
| 5,116,051 A | | 5/1992 | Moncrief et al. |
| 5,197,003 A | | 3/1993 | Moncrief et al. |
| 5,277,584 A | | 1/1994 | DeGroat et al. |
| 5,366,376 A | | 11/1994 | Copperman |
| 5,377,100 A | * | 12/1994 | Pope et al. .................... 600/545 |
| 5,399,091 A | | 3/1995 | Mitsumoto |
| 5,626,362 A | | 5/1997 | Mottola |
| 5,707,237 A | | 1/1998 | Takemoto |
| 5,823,876 A | | 10/1998 | Unbehand |
| 5,921,780 A | | 7/1999 | Myers |
| 5,951,018 A | | 9/1999 | Mamitsu |
| 5,993,216 A | * | 11/1999 | Stogner .......................... 434/29 |
| 6,012,926 A | * | 1/2000 | Hodges et al. ............... 434/236 |

(Continued)

*Primary Examiner* — Peter Egloff
(74) *Attorney, Agent, or Firm* — Larson & Larson, P.A.; Frank Liebenow

(57) ABSTRACT

A training system has sensors that monitor at least one biological parameter. During training, a stress level is determined/calculated based upon data from the sensors and, if the stress level is out of bounds, the training is modified and/or personnel are notified. For example, if the stress level is too high, the training is slowed or stopped and a trainer is notified.

17 Claims, 24 Drawing Sheets

(56) References Cited

U.S. PATENT DOCUMENTS

| | | | |
|---|---|---|---|
| 6,105,737 A | 8/2000 | Weigert | |
| 6,227,862 B1 | 5/2001 | Harkness | |
| 6,270,350 B1 | 8/2001 | Christopher | |
| 6,431,872 B1 | 8/2002 | Shiraishi | |
| 6,450,820 B1 * | 9/2002 | Palsson et al. | 434/236 |
| 6,623,428 B2 * | 9/2003 | Miller et al. | 600/300 |
| 6,916,074 B2 | 7/2005 | Jung | |
| 6,994,361 B2 | 2/2006 | Nishimura | |
| D531,221 S | 10/2006 | Shiraishi | |
| 7,625,287 B2 | 12/2009 | Champagne | |
| 2003/0097047 A1 * | 5/2003 | Woltermann et al. | 600/300 |
| 2004/0158476 A1 | 8/2004 | Blessinger | |
| 2004/0259059 A1 | 12/2004 | Aoki | |
| 2005/0090757 A1 * | 4/2005 | Kuramori et al. | 600/546 |
| 2006/0040239 A1 | 2/2006 | Cummins | |
| 2008/0064014 A1 | 3/2008 | Wojtczak | |
| 2008/0082372 A1 | 4/2008 | Burch | |
| 2009/0098519 A1 | 4/2009 | Byerly | |
| 2009/0163283 A1 | 6/2009 | Childress | |
| 2009/0306880 A1 | 12/2009 | Gomi | |
| 2011/0009193 A1 * | 1/2011 | Bond et al. | 463/36 |

* cited by examiner

SYSTEM, METHOD AND APPARATUS FOR DRIVER TRAINING SYSTEM WITH STRESS MANAGEMENT

CROSS-REFERENCE TO RELATED APPLICATION

This application is also related to U.S. application titled, "System, Method and Apparatus for Driver Training with Dynamic Mirrors," which was filed on even date herewith. This application is a continuation-in-part of U.S. application titled, "System and Apparatus for Driver Training," application Ser. No. 12/889,448 filed on Sep. 24, 2010, which is a non-provisional application taking priority from U.S. patent application Ser. No. 61/277,768 filed Sep. 29, 2009, the disclosure of which is hereby incorporated by reference. This application is also related to U.S. application titled, "System, Method and Apparatus for Driver Training Feedback," application Ser. No. 12/889,451 filed on Sep. 24, 2010. This application is also related to U.S. application titled, "System, Method and Apparatus for Driver Training Shifting Feedback," now U.S. Pat. No. 8,469,711, issued Jun. 25, 2013.

FIELD

This invention relates to the field of training and more particularly to a training system with stress management.

BACKGROUND

Driving training simulators are well known. Such simulators often included controls that simulate the target vehicle (e.g. car, truck, bus, etc). It is known that such simulators improve skills and safety by familiarizing the trainee with operation of the vehicle by presenting simulated situations in which, making the wrong decision does not result in a potential accident or bodily harm. In this way, the trainee learns basic driving skills before they eventually need to perform using the actual target vehicle and before they have to perform using that vehicle while operating in traffic.

There are many types of simulators known. The simplest simulator is a typical driving video game having a display screen and a hand controller. In some systems, a simulated steering wheel is provided. A mock-vehicle is displayed on the display screen and the driver uses the hand controller to keep the mock-vehicle on a simulated, moving roadway on the display screen. This type of simulator helps build driver hand and eye coordination, but does not provide the true control operation of the real steering wheel, brake, clutch, shifter, windshield views and mirror views. Such simulators are more of a game than an actual driver training system.

Another type of simulator includes a video display screen to simulate a windshield view, a steering wheel, a gas pedal, a brake pedal, a shifter and, optionally, a clutch pedal. A road situation is displayed on the display screen and the driver uses the controls to drive the simulated vehicle, moving down a roadway that is displayed on the display screen. This type of simulator helps build driver skills, but does not include interaction with speedometers, tachometers, etc. Such simulators don't provide feedback from the shifter such as gear grinding when the clutch isn't operated correctly. Furthermore, such simulators have a fixed configuration relating to a single type/layout of vehicle. In some such simulators, certain gauges are provided to simulate the operation and information provided to a driver of this singular vehicle. All current simulators provide fixed scenarios to the trainee and evaluate the trainee responses in a fixed program, progressing from scenario to scenario in a linear progress.

None of the current driver training simulators provide training simulations that automatically adapt to the skills of the trainee. None of the current driver training simulators provide realistic shifting experience in which clutch/shifter coordination is required and tactile/audible feedback is provided when not operated correctly. None of the current driver training simulators provide configurable, interactive instrument clusters that react to touch of the trainee while adapting to the layout of any of many target vehicles.

There are many circumstances in which a trainee (e.g. driver) needs to reposition their head to better see different aspects of what is behind or next to the simulated vehicle. For example, when changing lanes, the trainee needs to change their angle with respect to the rear view mirror to see what is in the adjacent lane and while backing up, the trainee needs to change their angle with respect to the rear view mirror to see objects that are near the rear of the vehicle or the vehicle's tires. None of the current driver training simulators provide realistic rear view mirrors that adjust their image based upon the position and location of the trainee's head and eyes.

For example, Class 8 truck drivers have a peculiar and critical need to use rear view mirrors for lane-changing, passing, and multi-lane traffic; to determine the relative position of the back of the trailer when backing; to determine lane position of both tractor and trailer in any maneuver; to determine the trailer's rear tire positions at all times; and for navigation at rest stops and parking.

Existing simulators do not provide dynamic rear view mirrors (displays or portions of displays). In such, static mirrors present an image of what the driver sees from a fixed perspective, but does not mimic the actual operation of rear view mirrors, in that, as the trainee repositions their head, the image in the simulated rear view mirror remains static and does not adjust to the change in angle of the trainee's eyes or the distance from the trainee's eyes to the rear view mirrors. With prior training systems, images in rear view mirrors are updated to reflect forward or rearward motion of the simulated vehicle, but do not change based upon the trainee's head position. For many operations, it is critical that the trainee learn to move his or her head correctly relative to the rear view mirrors in order to see and understand the dynamic conditions that are occurring at the rear of the vehicle.

As the simulation difficulty exceeds the trainee's abilities, stress is often experienced by the trainee. For example, when the simulation becomes overwhelming because too many problems are occurring or severe simulated weather, often the trainee will experience stress. Some stress is normal and expected because operating of most vehicles (cars, trucks, boats, airplanes, etc.) under realistic conditions is not always an easy task. For some trainees, too much stress will metabolize into physical and emotional problems. For example, as a trainee's stress level increases because the trainee is in a very difficult simulation, sometimes the trainee becomes ill or becomes violent. Such illness or violence has the potential to cause health problems to the trainee (e.g. a broken hand) or damage to the simulation system. Short of such damage, if stress levels elevate to a certain point, it is often desired to consult with a training leader to understand the causes of the stress and to help the trainee cope with such stress because, surely, once the trainee has graduated and is operating a real vehicle, the trainee will encounter stressful situations and need to cope with such, without the help of a training leader.

What is needed is a driver training system that monitors stress of the trainee and takes steps to mitigate the stress.

SUMMARY

A training system is disclose having sensors that monitor at least one biological parameter. During training, a stress level is determined based upon data from the sensors and, if the stress level is out of bounds, the training is modified and/or personnel are notified. For example, if the stress level is too high, the training is slowed or stopped and a trainer is notified.

In one embodiment, a training system for providing training on operation of a vehicle is disclosed. The training system includes a computer having a storage device and a plurality of training segments stored in the storage device and accessible by the computer. The system has a sensor configured to measure at least one biological indicator of stress in the trainee. Software running on the computer presents the training segments to the trainee, simulating operation of the vehicle. Concurrently, the software reads data from the sensor and calculates a stress level of the trainee from the data. The software modifies operation of the training system based upon the stress level of the trainee (e.g. slows or stops the training and/or notifies a trainer).

In another embodiment, method of training a trainee in use of a vehicle is disclosed. The training system includes a computer that includes a storage device. The storage device has a plurality of training segments. The training system includes a sensor configured to measure at least one biological indicator of stress in the trainee. The method includes (a) presenting one of the training segments and (b) reading data from the sensor. A (c) stress level of the trainee is determined from the data and (d) the stress level is compared to a pre-determined value. (e) Ff the step of comparing indicates an abnormal stress level, steps are initiated to alleviate the stress level. (f) The above steps (a-e) are repeated.

In another embodiment, a system for training a trainee regarding the use of a vehicle is disclosed including a computer training segments accessible by the computer. A display is operatively interfaced to the computer for presentation of the training segments. The system displays one or more of the training segments sequentially on the display to simulate operation of the vehicle. During such, the system reads at least one biological indicator of stress of the trainee (e.g. from one or more sensors) and calculates a stress level of the trainee from the at least one biological indicator of stress. The system takes action when an undesired stress level is detected.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
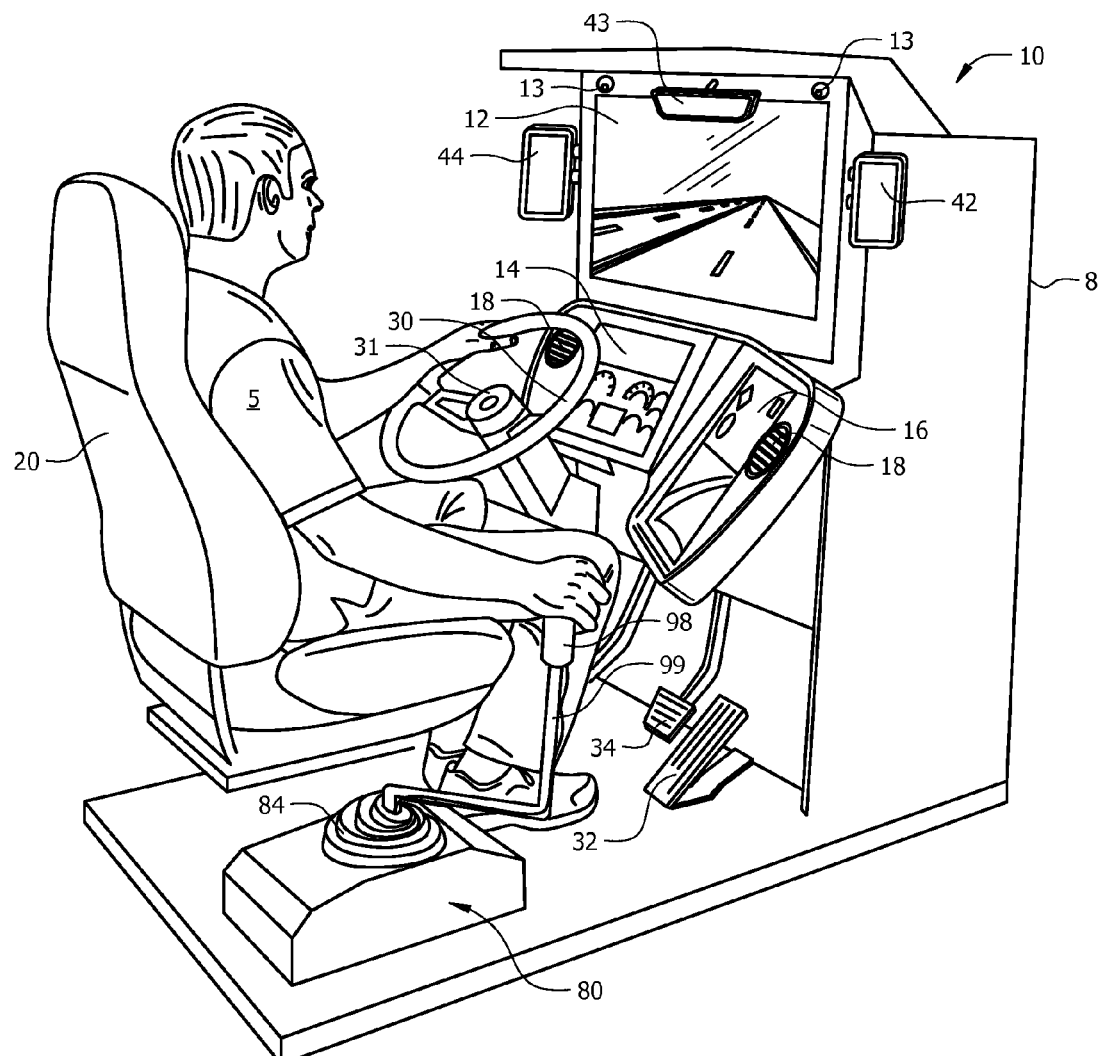
FIG. 1 illustrates a perspective view of a training system.

Reference will now be made in detail to the presently preferred embodiments of the invention, examples of which are illustrated in the accompanying drawings. Throughout the following detailed description, the same reference numerals refer to the same elements in all figures. In general, the training system 10 is often known as a driving simulator, flying simulator, boating simulator, or any other name for such a simulator, depending upon the target vehicle (car/truck, airplane, boat, train, etc). The training system 10 is any system for training a trainee (e.g. truck driver trainee) that simulates some or all of the operator controls (e.g. steering, brake, shifter) and visuals (e.g. mirrors, windows, dash boards, etc) without requiring the trainee to operate the actual vehicle (e.g., drive the actual truck). Although not limited to any particular target vehicle, the remainder of this description will use a truck as an example of such target vehicle for brevity reasons. Note that some of the controls described (e.g. shifter, clutch, steering wheel) are related to certain types of target vehicles and not necessarily to others. For example, many automobiles have automatic transmissions and, therefore, do not have a clutch. In another example, an airplane does not have rear-view mirrors, shifters, clutches, etc. Likewise, a truck driving simulator has rear-view mirrors, shifters, clutches, but does not have ailerons, thrust, altitude gauges, etc.

Figure 13:
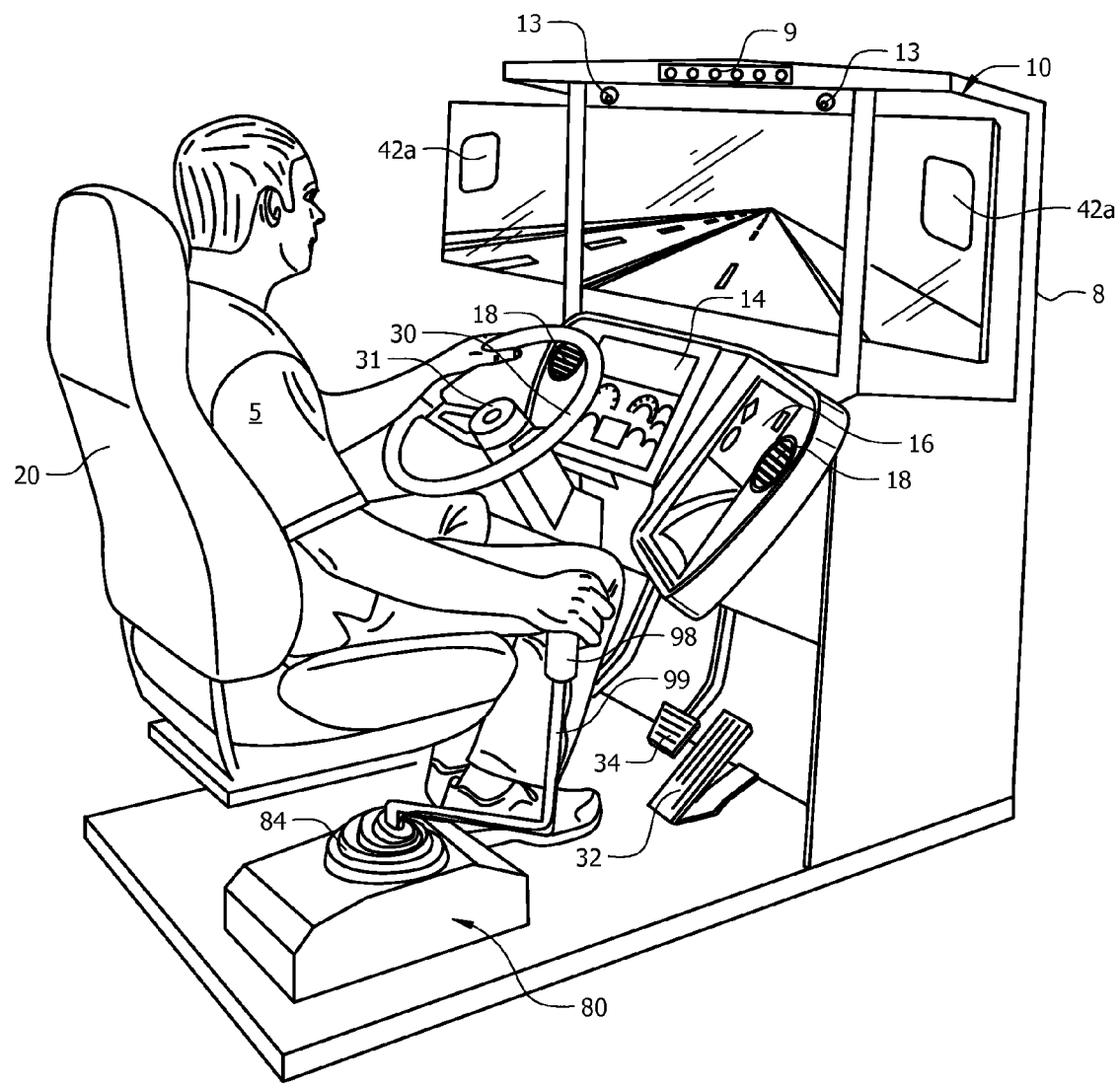
FIG. 13 illustrates a perspective view of a training system in which the rear view mirrors are simulated as part of a single display.

Referring to FIGS. 1 and 13, perspective views of a training system 10 are shown. In FIG. 1, simulated rear view mirrors 42/43/44 are implemented as discrete display devices. In FIG. 13, simulated rear view mirrors 42/43/44 are implemented as portions of the windshield display 12. The training system 10 is supported and/or housed by/in a cabinet 8. The training simulator 10 provides life-like training without or before operation of the target vehicle, in this example a vehicle such as a truck or an automobile.

The exemplary training system 10 has a windshield display 12 on which a simulated driving situation is presented as the trainee 8 would see through the windshield of the target vehicle. The windshield display 12 shows, for example, the road being driven upon, the grade of the road, obstacles such as other vehicles, tress, parked cars, pot holes, etc. In some training scenarios, the windshield is fogged or distorted by simulated weather condition s such as rain, snow, sleet, etc.

The trainee 5 typically sits on a seat 20 that, preferably, though not required, mimics a seat of the target vehicle. The trainee has controls similar to those in the target vehicle such as a steering wheel 30, horn 31, gas pedal 32, brake pedal 34, clutch 36 (see FIG. 2), and shifter having a shifter shaft 99 and a shifter handle 98 and shifter sub-system 80. The shifter subsystem is often covered with a boot 84 to keep dust, liquids, etc from damaging the working components.

In a preferred embodiment, though not required, the steering wheel 30 and shift handle 98 have touch sensors that detect if and when the trainee 5 is grasping the steering wheel 30 and/or shift handle 98. The touch sensors are any known touch sensor such as a mechanical switch or switches, capacitive or resistive detectors, etc. In some embodiments, the position of the trainee's hands is determined by the camera(s) 13 or a sensor array 9 in conjunction with or instead of the touch sensors.

In some embodiments, a force or strain detector 123 (see FIG. 8) is coupled to the shifter arm 99. The strain detector 123 provides information to determine how hard the trainee 5 is pushing or pulling the shifter handle 98.

Figure 3:
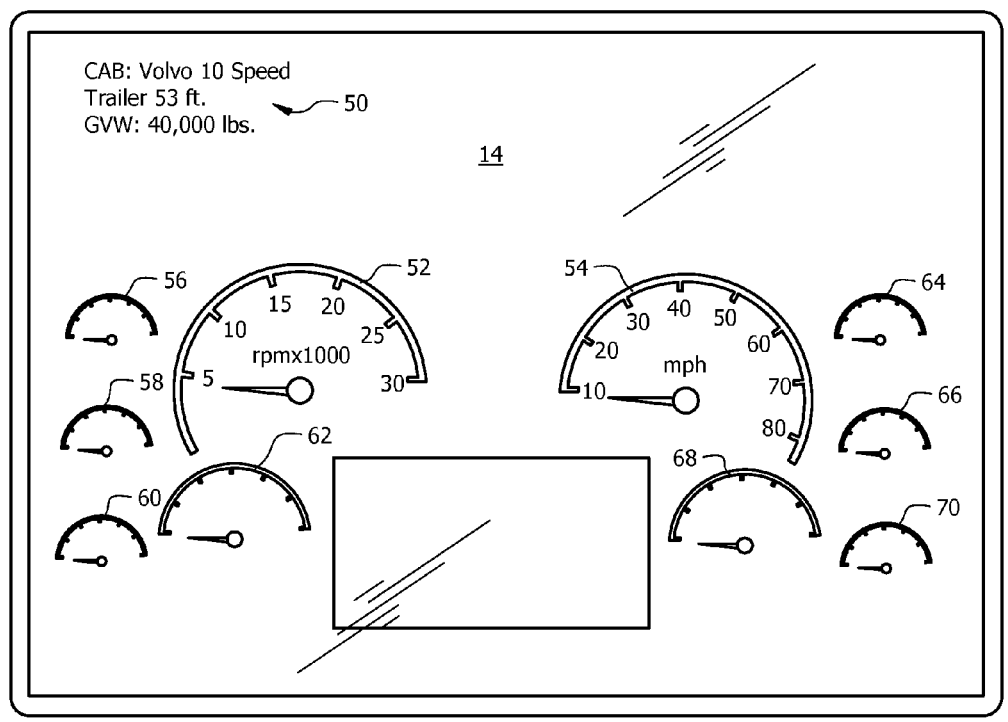
FIG. 3 illustrates a plan view of a training system dashboard.
Figure 4:
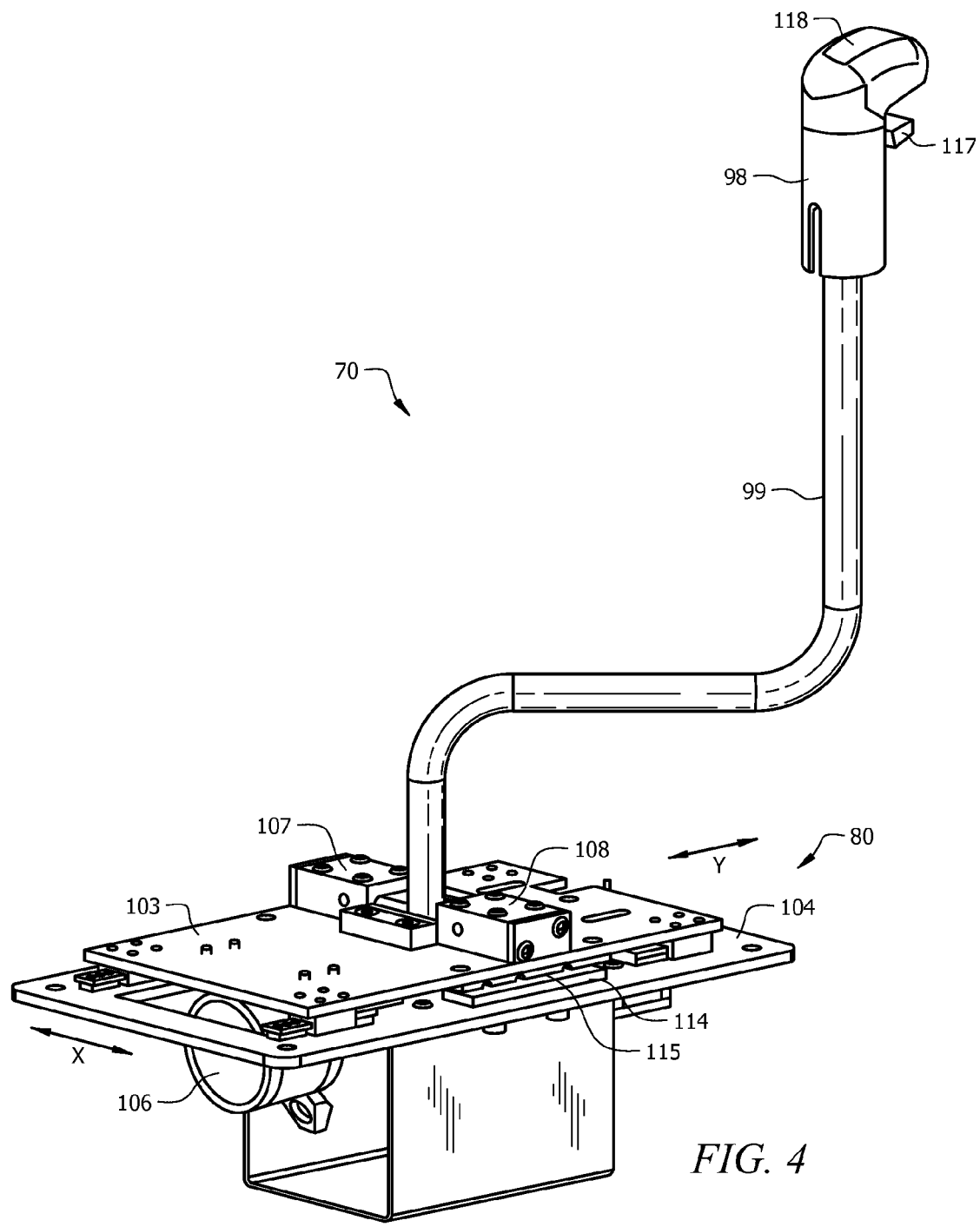
FIG. 4 illustrates a perspective view of a shifting training sub-system.
Figure 5:
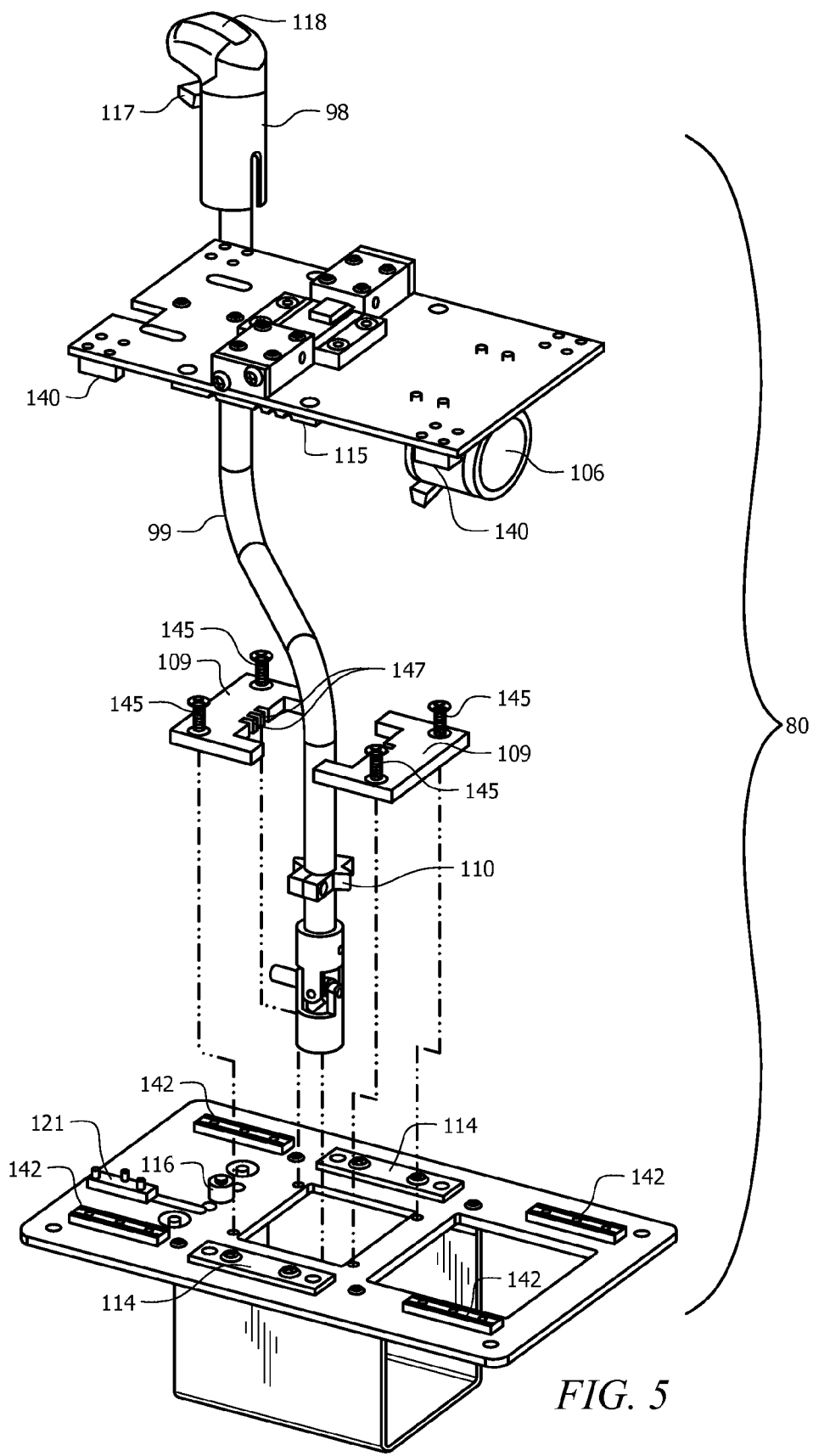
FIG. 5 illustrates an exploded view of the shifting training sub-system.
Figure 6:
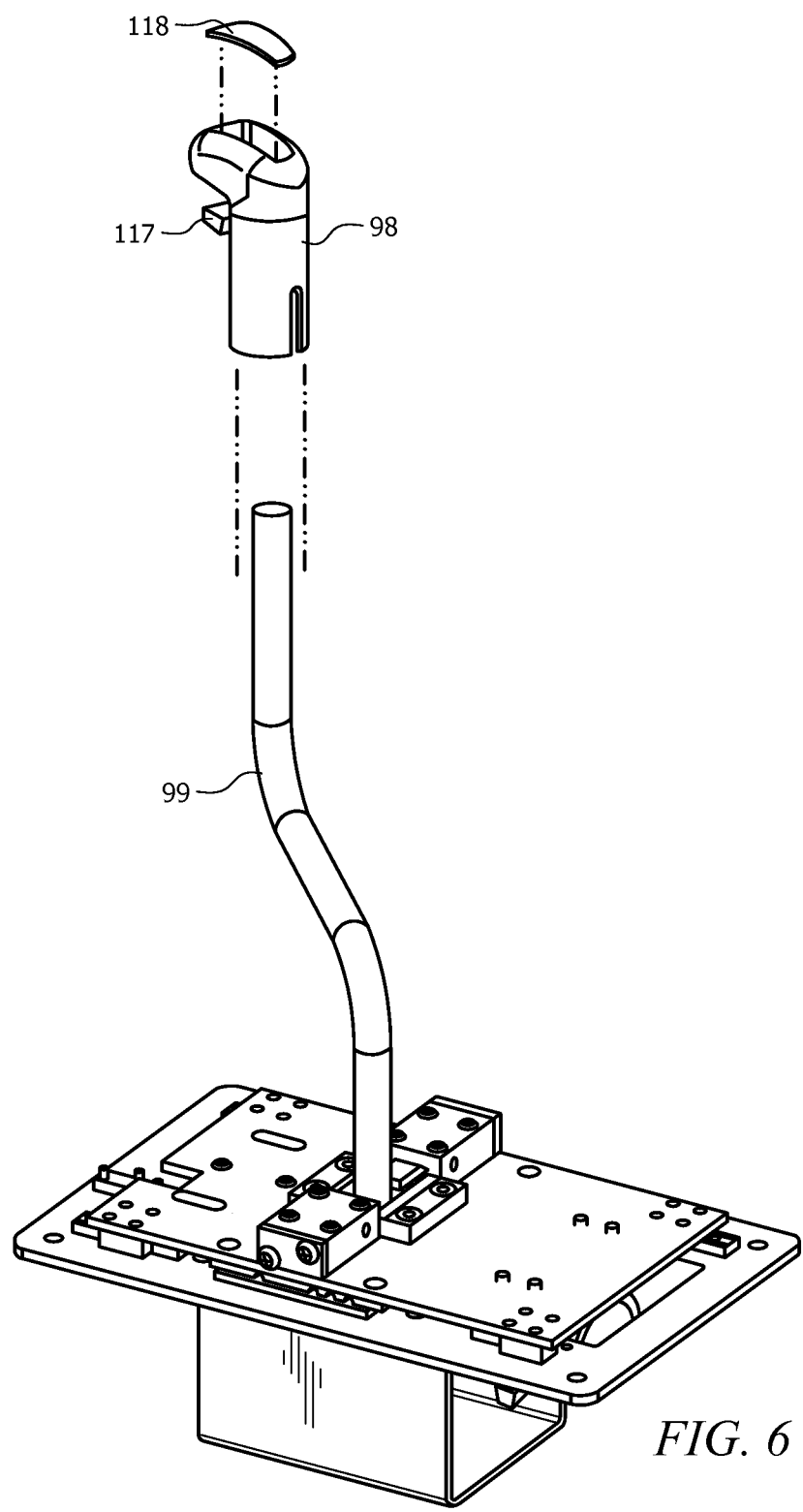
FIG. 6 illustrates a perspective view of the shifting training sub-system showing the handle connection.
Figure 7:
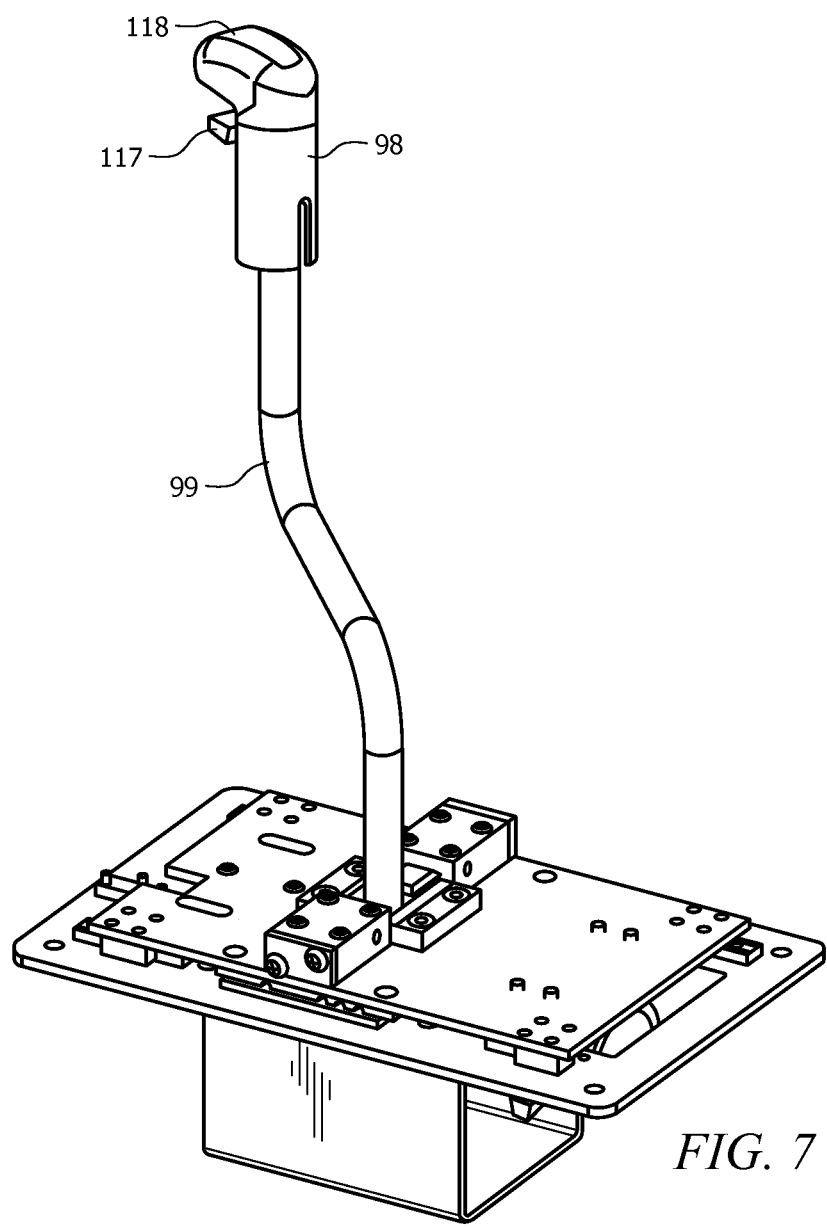
FIG. 7 illustrates another perspective view of the shifting training sub-system.

In a position similar to that of a dashboard of the target vehicle is a dashboard (e.g. display) 14 (details of an exemplary dashboard 14 are shown in FIG. 3). The dashboard 14 contains displays and indicators that inform the trainee of various target vehicle and external conditions such as speed, engine speed (RPM), engine temperature, outside temperature, brake temperature, air pressure, oil pressure, etc. In some embodiments, the dashboard 14 is fabricated from actual meters, indicators, etc, as in the target vehicle. In a preferred embodiment, the dashboard 14 is a graphics display on which the meters, indicators, etc of the target vehicle are displayed/simulated. It is also preferred that each sub-component of the dashboard 14 is touch-sensitive. In such, the training system 10 prompts the trainee 5 to, for example, "touch" the tachometer, and the training system 10 receives a signal corresponding to the sub-component/icon that the trainee 5 touches. In embodiments in which the dashboard 14 is a graphics display, it is anticipated that the graphics display is touch-sensitive such that a touch over a displayed sub-component signals the training system 10 of the location touched, and therefore, the identification of the sub-component that is touched. In embodiments in which the dashboard 14 is fabricated from actual meters, indicators, etc, some or all sub-components have touch sensors such as pressure detectors or capacitive touch sensors, etc.

In some embodiments, one or more discrete side-positioned, rear-view mirror displays 42/44 are provided as in FIG. 1. In other embodiments, one or more side-positioned, rear view mirror image areas 42a/44a are reserved as part of the windshield display 12, as in FIG. 13. The rear-view mirror displays 42/44/42a/44a display a simulated view of what is visible to the trainee 5 such as vehicles being passed and/or approaching vehicles. In some embodiments, the side located rear-view mirror displays 42/44/42a/44a simulate views of objects as they would appear in a true mirror, simulating concave or convex mirrors as appropriate. Additionally, in some embodiments, the image displayed includes simulated mirror imperfections such as dirt, rain drops, etc, as often occurs in real life.

In the past, such rear-view mirror displays 42/44/42a/44a were static, in that, the image displayed showed one view of what is behind the trainee 5, independent of the location of the trainee's head and eyes. There are many scenarios when a driver, and hence the trainee 5, needs to position their head so that they are able to see certain aspects of what is behind the (simulated) vehicle. For example, it is often required that the driver (hence trainee 5) looking out the left mirror 44/44a move their head in away from the driver side window to make sure nothing is in the left lane or move their head toward the driver side window to view the status and position of the left truck wheels to better judge position, for example, within the lane or to avoid objects while backing up.

In recent years, technology has become available that will detect the spatial location of objects such as a person's arms, legs, head, torso, etc. To detect the location of the trainee's head and eyes for adjustment of rear view mirror images, the training system 10 includes a sensor array 9 for detecting, at least, the location of the trainee's head. By analyzing data from the sensor array 9, the training system 10 has knowledge of the position of the trainee's head and eyes with respect to the simulator's cab and with respect to each of the rear view mirrors 42/44/42a/44a. An example of such a sensor 9 and analysis technology is Kinect® manufactured by Microsoft®. In this technology, the sensor 9 is an array sensor 9 including, for example, cameras, depth sensors, IR sensors, and voice sensors. Although the array sensor 9 and analysis software is enabled to provide facial recognition, 3D construction, distances, facial expression analysis, body measurements (temperature, pulse rate, etc.), in this embodiment, the important aspects of the array sensor 9 and associated analysis software is delivery of a position of the trainee 5, an in particular, the trainee's head, without the need to make direct connections to the trainee. Although originally designed for a game console (Xbox 360®), Kinect®, including proprietary analysis software, provides full-body 3D motion capture, facial recognition and voice recognition. An array of microphones also provides for acoustic source localization and ambient noise suppression. Kinect® is disclosed as an enablement of the present invention and any type of position recognition system is anticipated to provide some or all of the features disclosed here within. For example, in some embodiments, the sensors 9 are one or more ultrasonic distance detection devices for determining the trainee's 5 position relative to one or more rear-view mirrors 42/44/42a/44a, etc.

The training system 10 utilizes the sensors 9 and analysis software in several ways to provide a more accurate simulation. For example, when the trainee 5 looks at the rear view mirrors 42/44/42a/44a, the location and position of the trainee's head is determined using data from the sensors 9 and the image in the displays of the rear view mirrors 42/44/42a/44a is adjusted to correspond to what the trainee 5 would be viewing from a perspective based on the angle and distance between the trainee's head and the rear view mirrors 42/44/42a/44a. For example, as the trainee 5 positions their head closer to the rear view mirrors 42/44/42a/44a, the display within the rear view mirrors 42/44/42a/44a is changed to reflect that distance, for example, zooming out on the content that is being displayed. As the trainee 5 shifts their head to the right or left, the image displayed in the rear view mirrors 42/44/42a/44a pans across a virtual image segment of a wide-view of what is in the rear of the simulation, showing, for example, the side of the simulated vehicle from one perspective and details of vehicles or guardrails that the simulated vehicle is passing in another perspective. In this way, the image in the mirror corresponds to the spatial position of the trainee's head (and therefore, eyes) and the trainee 5 learns how to reposition their head (and eyes) to see particular areas of the rear view that are important while, for example, moving forward within a lane or backing into a loading ramp.

Note that the particular sensor array 9 described is an example and any type of sensor and detection software is anticipated to determine the location of the trainee's head with respect to the mirrors 42/44/43/42a/44a, including infrared sensors, ultrasonic sensors, cameras, etc.

In some embodiments, a center-mounted rear-view mirror 43 is also provided. When provided, the rear-view mirror display 43 shows a simulated view of what is visible to the trainee 5 such as approaching vehicles and/or oncoming vehicles. As above, in some embodiments, the center-mounted rear-view display 43 is also augmented by the position of the trainee 5 to better simulate what is viewed in the center-mounted rear-view display 43 as the trainee 5 repositions their head and eyes.

In some embodiments, an information display and input device 16 are provided. The information display and input device 16 does not simulate something from the target vehicle. Instead, the information display and input device 16 presents menus, status information, and auxiliary information to the trainee 5 and accepts inputs such as scenario selection, study chapter selection, login data, etc.

In some embodiments, an audio system 18 is provided to enhance realism and provide simulations of sounds that are normally heard when operating the target vehicle such as engine noise, tire noise, other vehicles, rain or sleet hitting the target vehicle, emergency vehicles, sounds of a collision, etc.

In some embodiments, one or more trainee sensors 9/13 are provided to detect various aspects of the trainee 5 such as position upon the seat 20, head angle, attention, drowsiness and where the trainee is looking. This information is used, for example, to make sure the trainee is properly performing the task at hand. The trainee sensors 9/13 are, for example, cameras, light detectors, ultrasonic transducers, or any other detector as known in the industry. The trainee sensors 9/13 are coupled to the main computer 100 (see FIG. 9). The main computer 100 analyzes images from the trainee sensor(s) 9/13 to determine, for example, what the trainee 5 is doing, where the trainee 5 is looking, and the position/location of the trainee's head. In some embodiments, the sensor data is used to provide feedback to the trainee 5 and evaluate the trainee's abilities (e.g. the camera(s) 9/13 are used to determine if the trainee 5 looked in the right mirror display 42 before changing lanes).

Figure 2:
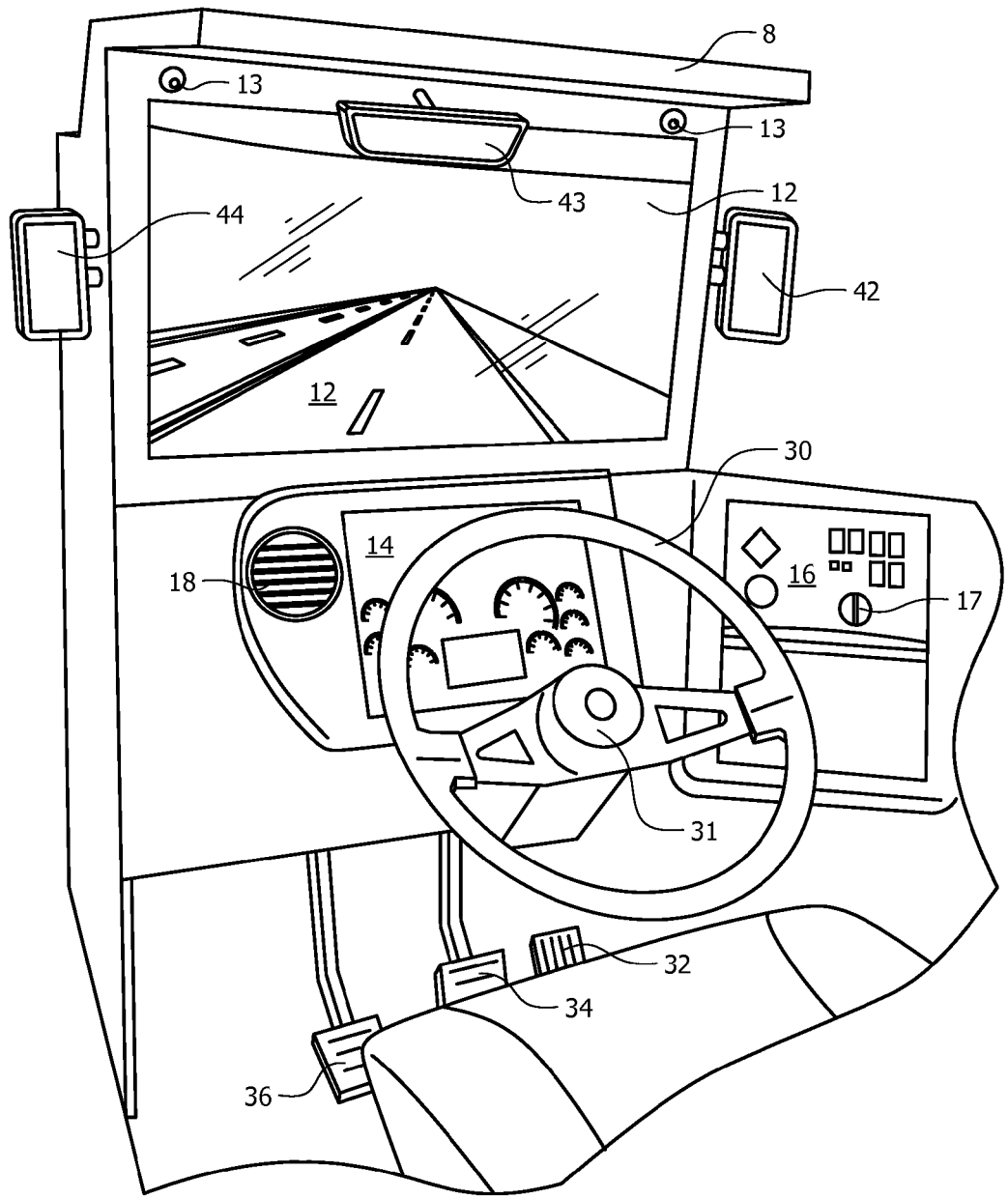
FIG. 2 illustrates a second perspective view of a training system.
Figure 14:
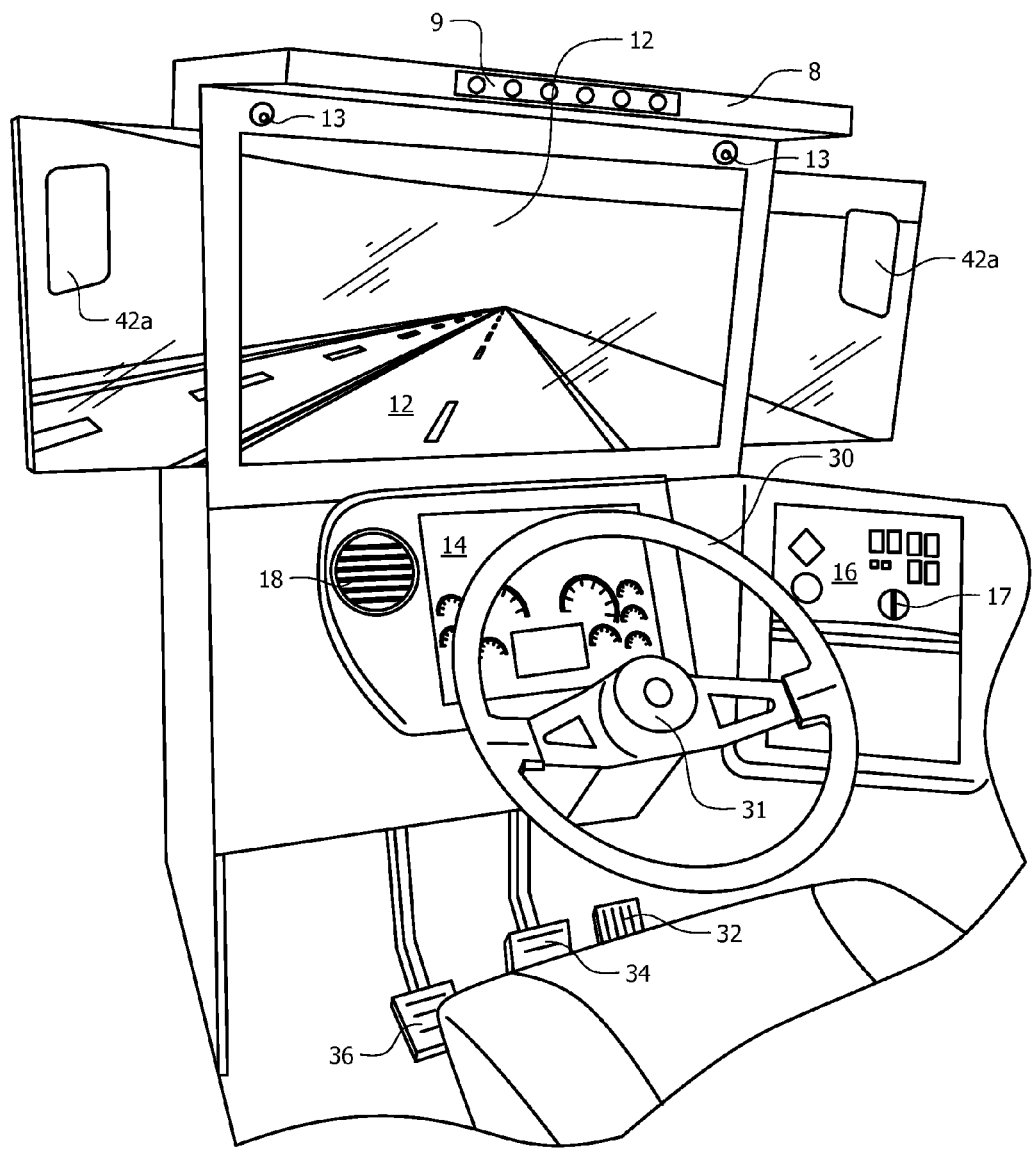
FIG. 14 illustrates a second perspective view of a training system in which the rear view mirrors are simulated as part of a single display.

Referring to FIGS. 2 and 14, second perspective views of a training system are shown. In FIG. 2, simulated rear view mirrors 42/43/44 are implemented as discrete display devices. In FIG. 14, simulated rear view mirrors 42/43/44 are implemented as portions of the windshield display 12. In this view, an optional centrally-located rear-view mirror display 43 is shown above the windshield display 12. When provided, the rear-view mirror display 43 shows a simulated view of what is visible to the trainee 5 such as vehicles being passed and/or approaching vehicles. In some embodiments, one, two or three mirror displays 42/43/44 are provided. As discussed prior, in some embodiments, any or the entire mirror displays 42/43/44 are also augmented by the position of the trainee 5 to better simulate what is viewed in the mirror displays 42/43/44 as the trainee 5 repositions their head and eyes. The trainee sensor(s) 9/13 are positioned as needed to determine the position, stance and view of the trainee 5. In some embodiments, the trainee sensor(s) 9/13 provide full three-dimensional position detection, facial expression detection, etc., as discussed prior.

In FIGS. 2 and 14, the information display and input device 16 is shown with greater detail. This display does not necessarily simulate a feature of the target vehicle, but in some embodiments, does contain features that map to a feature of the target vehicle. In this example, the information display and input device 16 includes an ignition switch icon 17 that looks like the ignition switch of the target vehicle. Typically, the information display and input device 16 shows informational messages such as information regarding the current courseware segment or summaries of the last simulation (e.g. the trainee 5 hit two parked cars and knocked down one telephone pole, etc). In a preferred embodiment, the information display and input device 16 includes a touch screen. In such embodiments, the trainee 5 uses the touch capabilities to make selections and to select items as requested (e.g. "touch the ignition switch").

In some embodiments, the windshield display 12 is also touch sensitive. This provides even more capabilities for testing the trainee's 5 ability to identify environmental (e.g. roadway) objects such as signs, barriers, etc. For example, the trainee is asked to touch the stop sign or touch the lane in which is most appropriate for his/her vehicle, etc.

Again, in some embodiments, one or more trainee sensors 13 are integrated into the training system 10. The trainee sensors (e.g. camera or cameras) 9/13 are coupled to the main computer 100. The main computer 100 analyzes data from the trainee sensor(s) 9/13 to determine, for example, what the trainee 5 is doing, where the trainee 5 is looking, and the position/location of the trainee 5. In some embodiments, this data is used to provide feedback to the trainee 5 and evaluate the trainee's abilities (e.g. the trainee sensor(s) 9/13 are used to determine if the trainee 5 looked in the right mirror display 42/42a before changing lanes). The trainee sensor(s) 9/13 are positioned as needed to determine the position, stance and view of the trainee 5. In some embodiments, the trainee sensor(s) 9/13 provide full three-dimensional position detection, facial expression detection, etc., as discussed prior.

By analyzing data from the sensor 9/13, the training system 10 has knowledge of the position of the trainee's head and eyes with respect to the simulator's cab and with respect to each of the rear view mirrors 42/44/42a/44a. Although the array sensor 9 and analysis software is enabled to provide facial recognition, 3D construction, distances, facial expression analysis, body measurements (temperature, pulse rate, etc.), in this embodiment, the important aspects of the array sensor 9 and associated analysis software is delivery of a position of the trainee 5, an in particular, the trainee's head, without the need to make direct connections to the trainee.

There is no limitation on the sensors 9. For example, in some embodiments, the sensors 9/13 are one or more ultrasonic distance detection devices for determining the trainee's 5 position relative to one or more rear-view mirrors 42/44/42a/44a, etc.

The training system 10 utilizes the sensors 9/13 and analysis software in several ways to provide a more accurate simulation. For example, when the trainee 5 looks at the rear view mirrors 42/44/42a/44a, the location and position of the trainee's head is determined using data from the sensors 9/13 and the image in the displays of the rear view mirrors 42/44/42a/44a is adjusted to correspond to what the trainee 5 would be viewing from a perspective based on the angle and distance between the trainee's head and the rear view mirrors 42/44/42a/44a. For example, as the trainee 5 positions their head closer to the rear view mirrors 42/44/42a/44a, the display within the rear view mirrors 42/44/42a/44a is changed to reflect that distance, for example, zooming out on the content that is being displayed. As the trainee 5 shifts their head to the right or left, the image displayed in the rear view mirrors 42/44/42a/44a pans across a virtual image segment of a wide-view of what is in the rear of the simulation, showing, for example, the side of the simulated vehicle from one perspective and details of vehicles or guardrails that the simulated vehicle is passing in another perspective. In this way, the image in the mirror corresponds to the spatial position of the trainee's head (and therefore, eyes) and the trainee 5 learns how to reposition their head (and eyes) to see particular areas of the rear view that are important while, for example, moving forward within a lane or backing into a loading ramp.

Referring to FIG. 3, a plan view of an exemplary training system dashboard 14 is shown. The dashboard 14 contains displays and indicators that inform the trainee of various target vehicle internal and external conditions such as speed 54, engine speed (RPM) 52, engine temperature 56, outside temperature 58, battery voltage 60, air pressure 64, oil pressure 66, fuel reserve 68, oil temperature 70 etc. In some embodiments, the dashboard 14 is fabricated from actual meters, indicators, etc, as in the target vehicle (not shown). In a preferred embodiment, the dashboard 14 is a graphics display on which the meters, indicators, etc of the target vehicle are simulated by images (e.g. icons) of the respective components from the target vehicle. In this way, the dashboard 14 is reconfigurable between different target vehicles (e.g. some vehicles have more/less meters and more/less "idiot lights").

It is also preferred that each sub-component of the dashboard 14 is touch-sensitive. In the example of FIG. 3, the entire graphics display 14 is touch sensitive (touch panel as known in the industry) and, touching of any of the sub-components 52/54/56/58/60/62/64/66/68/70 signals the main computer 100 that the corresponding sub-components 52/54/56/58/60/62/64/66/68/70 was touched. This provides the capability of questions/response scenarios like, "touch the fuel gauge . . . " and detection of the icon (sub-component 52/54/56/58/60/62/64/66/68/70) that was touched.

In some embodiments, status or identification information 50 is provided on the dashboard 14 such as the vehicle details and, perhaps, the name of the trainee 5, etc.

Referring to FIGS. 4 through 8, views of a shifting training sub-system 70 are shown. The shifting training sub-system 70 includes a transmission simulation section 80, a shaft 99 and a handle 98. In some embodiments, a touch detector 118 is provide on the handle 98 for detecting if a hand of the trainee 5 is touching the shifter handle 98, for example, a capacitive sensing detector 118.

The transmission simulation section 80 is preferably a two plate design. The transmission simulation section 80 includes a top plate 103 and the bottom plate 104. The top plate 103 and the bottom plate 104 allow travel of the shifter in the "Y" direction. One or more linear bearing(s) 140/142 enable movement of the top plate 103 relative to the bottom plate 104 in the "Y" direction for a limited distance. This provides the "Y" direction travel for the shifter shaft 99.

When the top plate 103 moves relative to the bottom plate 104, a spring loaded "Y" ball detents 114 provide several natural stopping locations similar to those of the transmission of the target vehicle. The "Y" ball detent 114 and the "Y" detent grooves 115 provide the natural stopping locations as well as simulated increase and release of force when shifting into simulated gear positions. The spring loaded "Y" ball detent plungers 114 provide a simulated feel of gear engagement as shift handle 98 and arm 99 are pushed.

Located on the bottom plate 104 is a transmission lock out solenoid 116. A movable core of this computer controlled transmission lock out solenoid 116 engages with the top plate 103, locking the top plate 103 in position over the bottom plate 104 under control of the computer 100. This provides simulated limited "Y" movement and simulates gear change restrictions and also provides an actuator system that locks the operator out of gear if a shift operation is missed.

Attached (e.g. by screws 145) to the bottom plate 104 is an H-gate 109. The H-gate 109 limits the "X" direction travel of the shifter shaft 99. A shift arm guide 110 mesh into detents 147 of the H-gate 109. Only certain combinations of positions of X and Y displacements are allowed by the H-gate 109 and shift arm guide 110. This provides limits to total travel of the shift arm guide 110 by amounts limited by the combination of the X and Y travel and in appropriate simulated shifting patterns.

The transmission top plate 103 also includes the transducer system 106. The transducer system 106 outputs noise and vibration to simulate gear box noise and vibration. This transmission noise and vibrations are conducted through parts of the transmission shaft 99 to provide the feel of an actual transmission in an operating target vehicle.

The transmission top plate 103 also includes the two transmission spring loaded detents 107 (left) and 108 (right). The spring detent includes an initial load detent 9. The initial load detent 9 provides a preload to the initial force required for movement of the shifting shaft 99. This initial load detent 9 is applied to the right 108 and/or left 107 spring loaded detents. The purpose of the detents is to simulate the force and feel of a manual transmission.

Optionally, a pneumatic range switch 117 and a pneumatic splitter switch (not visible) are provided on the shifter handle 98, mounted on the top portion of the shifter shaft 99. The operation/position of the pneumatic range switch 117 and the pneumatic splitter switch 118 are detected by the ranged switch detector 119 are communicated to the computer 100. These simulate the range and splitter switch for a manual transmission. The position of these switches is used by the training system 10 during various driving scenarios.

A "Y" position sensor 121 and a "X" position sensor 122 are located on the bottom plate 104. The "Y" position and "X" position of the shaft 99 are communicated to the computer 100 by the "Y" position sensor 121 and "X" position sensor 122 respectively.

Located in or on the shifter handle 98 is a hand position sensor 118. The hand position sensor 118 detects if the trainee's 5 hand is in proximity to the top of the shifter shaft, providing the computer 100 with information regarding hand placement. In a preferred embodiment, the hand position sensor 118 is a proximity detector such as a capacitive or resistive sensor as known in the industry.

Figure 8:
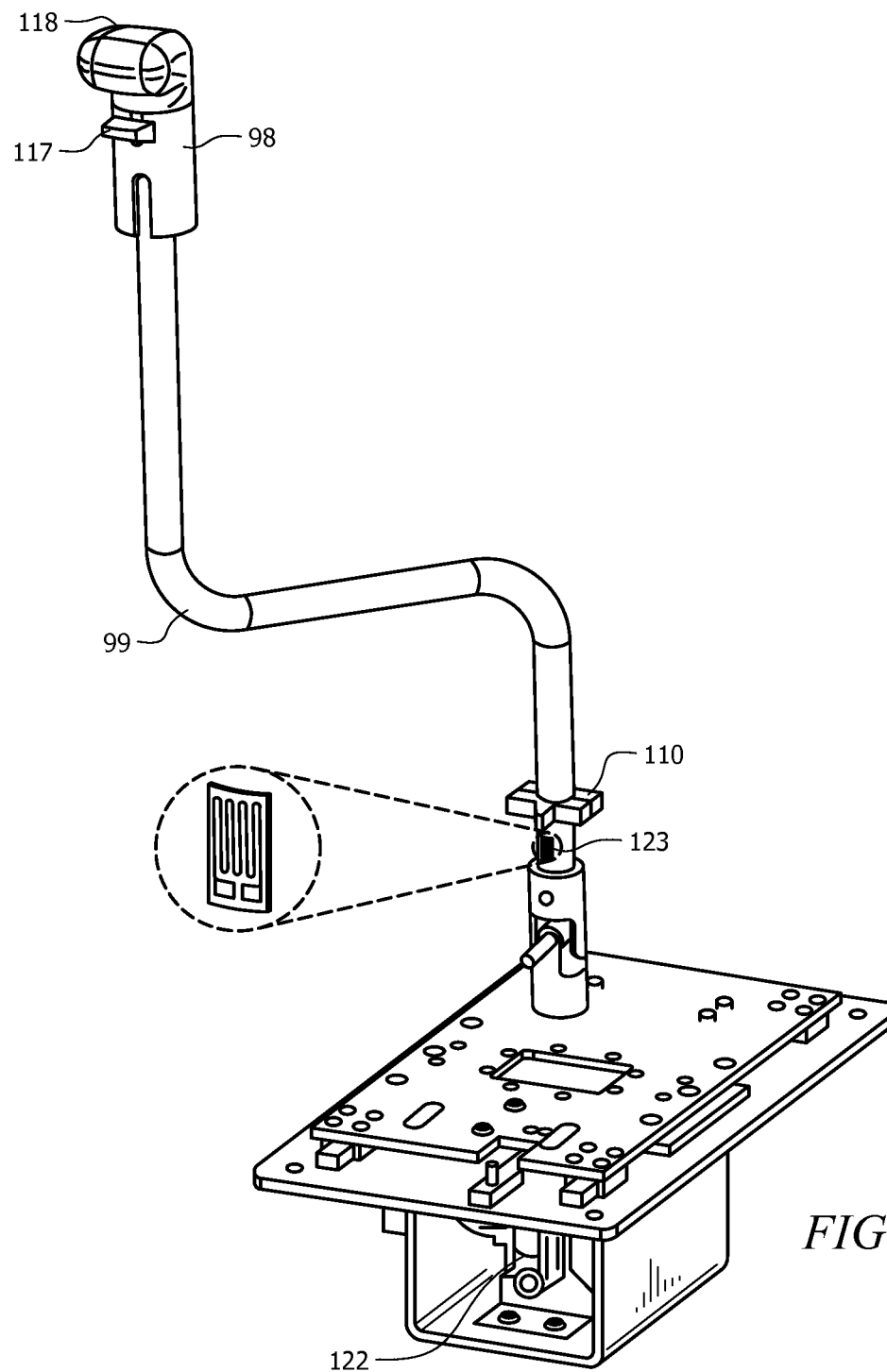
FIG. 8 illustrates a perspective view of the shifting training sub-system showing the force sensor.

Located on the lower portion of the shifter shaft 99 is a shaft force sensor 123 (FIG. 8). The shaft force sensor 123 provides a signal to the computer 100 indicating an amount of force exerted on the shaft by the trainee 5. When an excessive force is determined (e.g. an over load condition), the computer 100 signals an alarm (e.g. audio signal over the audio system 18).

Figure 9:
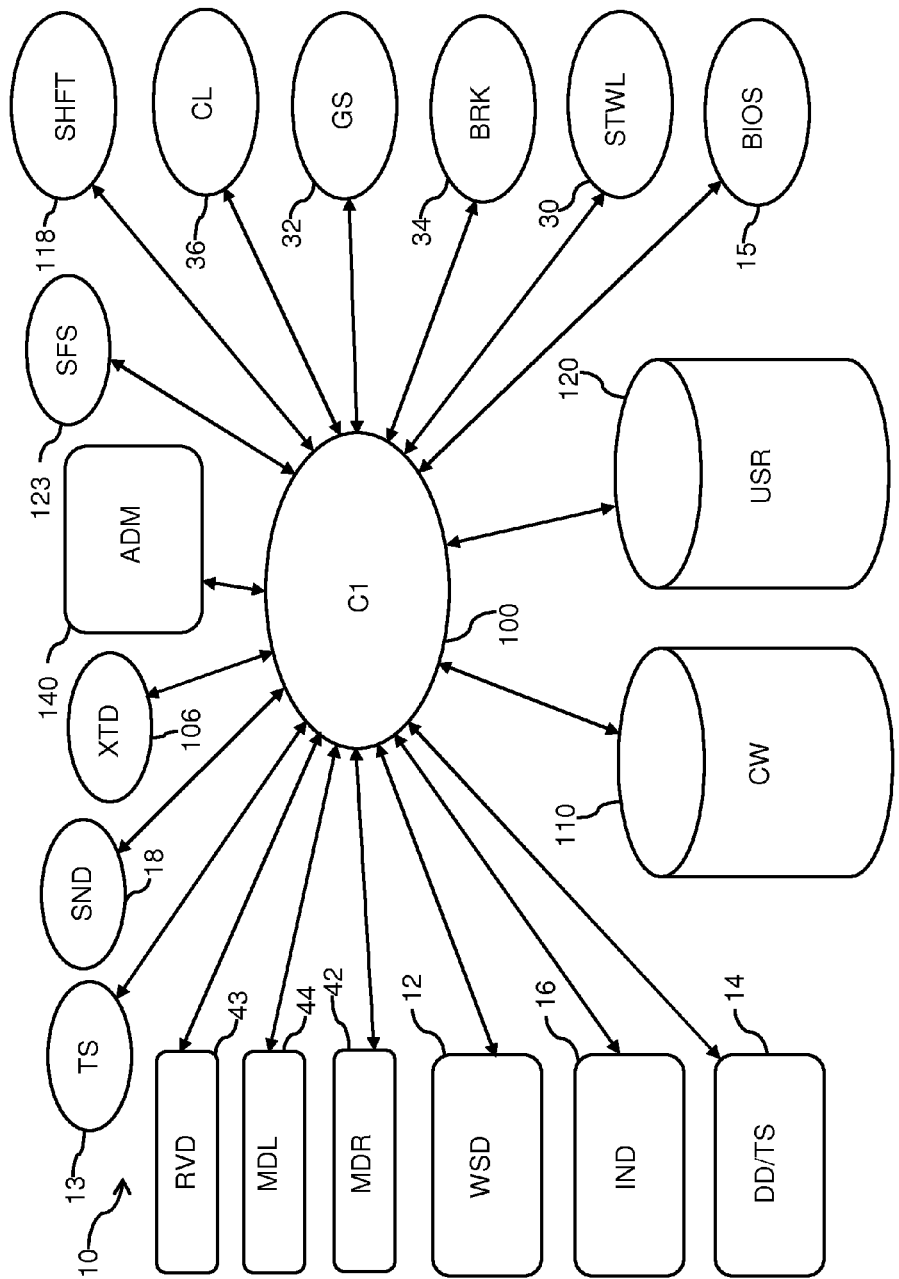
FIG. 9 illustrates a schematic view of an exemplary training system.

Referring to FIG. 9, a schematic view of an exemplary training system is shown. As discussed prior, it is anticipated that one or more of the following described features is or is not present in all embodiments. For example, in some embodiments, there is no trainee sensor 13 that determines where the trainee 5 is looking, etc.

Central to the training system 10 is a computer 100. Many different types of computers 100 are anticipated such as personal computers, dedicated computers and server computers. It is anticipated that computers 100 of one training system 10 are connected by local or wide area networks to other training systems 10 and/or to central data collection and control systems (not shown). In some embodiments, the computer has a motherboard with multiple PCI-Ex16 slots that provide multiple simulator display channels with 2D and/or 3D capability. A video processor card is optionally installed in each of these slots. The video cards run the simulation in multi channel mode with low transient delay times. It is anticipated, though not required, that a single image generator (single motherboard computer) can drive multiple displays. Although any number of display channels is anticipated, the training system typically is configured with from 3 to 8 real time interactive screens.

The computer 100 includes, in some embodiments, a display device or terminal device 140. This device 140 has a display screen, a keyboard and/or a touch screen and is primarily used by an administrator to operate the computer 100, for example, performing backups and other system administration function. In some embodiments, these functions are performed using one or more of the other components/displays 12/14/16.

The computer 100 also includes persistent storage 110/120 such as hard drives, flash memory, etc. for storage of, for example, courseware 110 and user information 120. In a preferred embodiment, the persistent storage 110/120 is one or more hard drives or solid-state drives. In some embodiments, the storage 110/120 is a raid system to provide more reliable data storage.

Interfaced to the computer 100 are several components of the training system 10. The windshield display 12, dashboard (e.g. dashboard graphics display and touch screen) 14 and information display 16 are all interfaced to the computer 100 as known in the industry. The mirror displays 42/43/44 (when present) are also interfaced to the computer 100 as known in the industry. All specialized hardware devices such as the shifter touch detector 118 (also the X-position, Y-position, switch status not shown for brevity reasons), clutch (position and force) 36, gas pedal (position and force) 32, brake pedal (position and force) 34 and steering wheel (rotation and touch) 30 are also interfaced to the computer 100 as known in the industry. It is preferred that some or all of such interfaces are bi-directional to provide control of the device (e.g. vary the counter-force of the brake pedal 34 or gates of the transmission 80) and to receive feedback from the device (e.g. sufficient pressure was applied to the brake pedal 34, hands are on the steering wheel 30 or the trainee 5 successfully shifted from first gear into second gear).

In embodiments that have trainee sensors 13 such as cameras, etc, the trainee sensors 13 are interfaced to the computer 100 as known in the industry.

In embodiments that have hand proximity sensors 118 (on shifter handle 98, the hand proximity sensors 123 are interfaced to the computer 100 as known in the industry.

In embodiments that have shifter force sensors 123 (on shifter shaft 99, the shifter force sensors 123 are interfaced to the computer 100 as known in the industry.

In some embodiments, one or more biometric sensors 15 are interfaced to the computer 100. The biometric sensors 15 sense, for example, fingerprints, retina, face characteristics, etc, of a user of the training system 10 to make sure the training and results correspond to the correct trainee 5, thereby preventing one trainee 5 from intentionally or unintentionally scoring/learning for another trainee 5.

In embodiments having a sound system 18, the sound system 18 is interfaced to the computer 100 as known in the industry such as audio outputs connected to amplifiers and speakers, TOSLINK, USB, etc.

Figure 12:
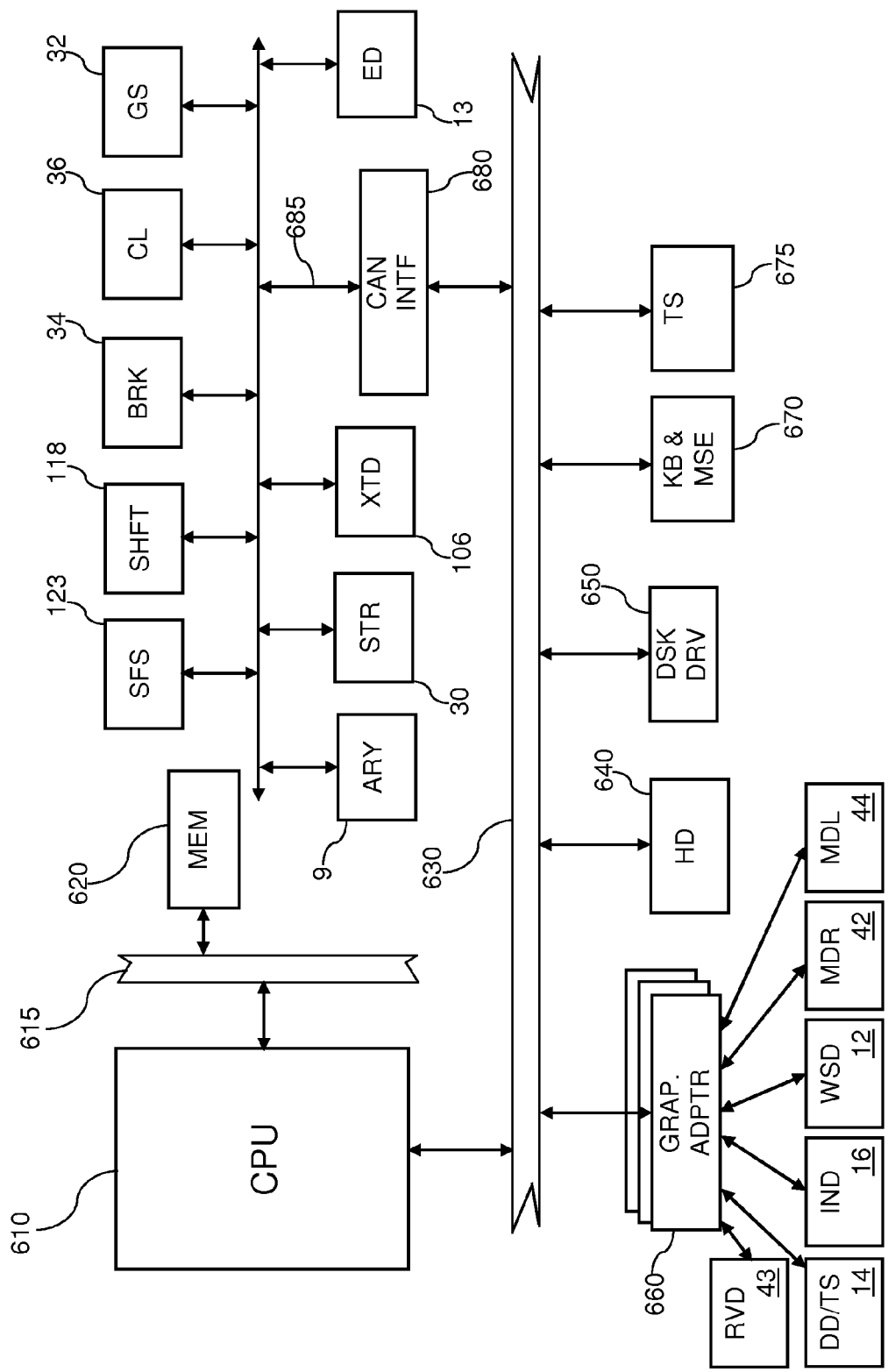
FIG. 12 illustrates a schematic view of a typical computer system.

In embodiments having a transmission transducer 106, the transmission transducer 106 is interfaced to the computer 100 as known in the industry such as through audio outputs connected to amplifiers and speakers, TOSLINK, USB, etc or over a local area network (see FIG. 12).

Figure 10:
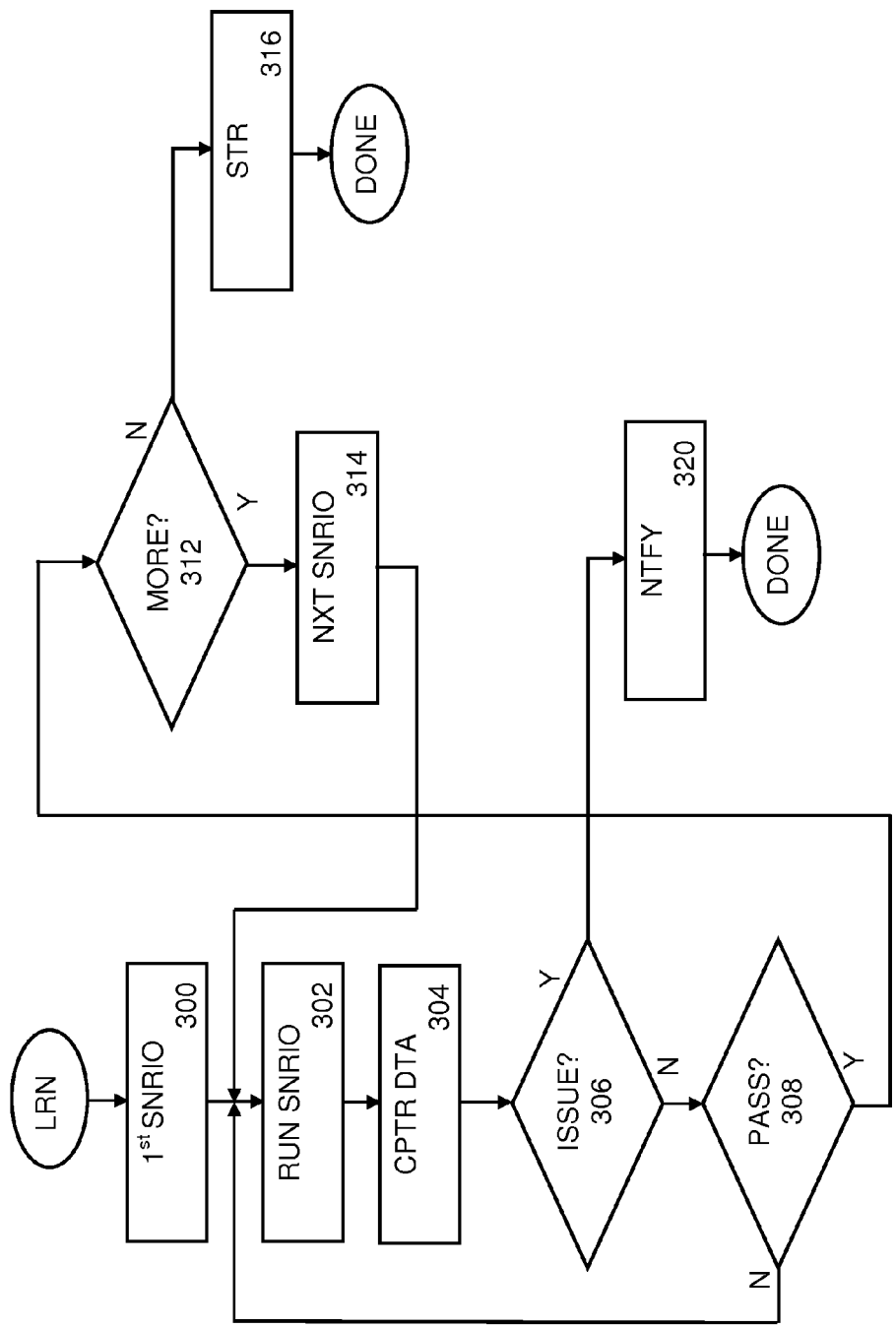
FIG. 10 illustrates a flow chart of the prior art.

Referring to FIG. 10, a flow chart of a training model of the prior art is shown. This represents either one segment of a training method or the entire training method of the prior art. In it, a first scenario/segment is selected 300 then run 302 and data is captured 304 during and/or after the scenario/segment is run. An example of a simple scenario/segment is a simulation of driving down a road way, approaching an unmarked intersection and a vehicle pulls out from the intersection into the path of the trainee 5. If the captured data indicates a major issue occurred 306 such as the trainee 5 didn't apply the brakes, records are made and the appropriate training personnel are notified 320.

The data is analyzed 308 to determine the performance of the trainee 5 in the given scenario/segment meets passing requirements. If not, the scenario/segment is repeated 302/304/306/308. If the trainee 5 meets passing requirements 308, it is determined if there are more scenarios/segments 312 for the trainee 5 (e.g. scenarios/segments are often grouped in chapters and the trainee 5 is finished when he/she complete a chapter, etc). If there are more scenarios/segments 312, the next scenario/segment is retrieved 314 and the above steps 302/304/306/308/312 are repeated until there are more scenarios/segments planned for the trainee 5 and the captured data is stored 316 for progress analysis, grading, etc.

The methods of the prior art do not adapt to the trainee's 5 demonstrated abilities, running scenarios/segments sequentially, independent of any progress that the trainee 5 has made. For example, in a set of scenarios/segments are crafted to teach defensive driving, offending vehicles are displayed moving into the path of the trainee 5. If the trainee 5 demonstrates excellent responses to each of the first few scenarios/segments, the latter scenarios/segments are still presented, often boring the trainee 5. Similarly, if the trainee 5 shows a weakness in a certain operation such as double-clutching, the prior art would only repeat the scenarios/segments until the trainee 5 is able to pass that segment. In the later situation, it is desirable to access other scenarios/segments that may have already been completed for extra training on the operation of which the trainee 5 is having difficulty. The prior art does not address such operation to adapt to the demonstrated abilities of the trainee 5.

Figure 11:
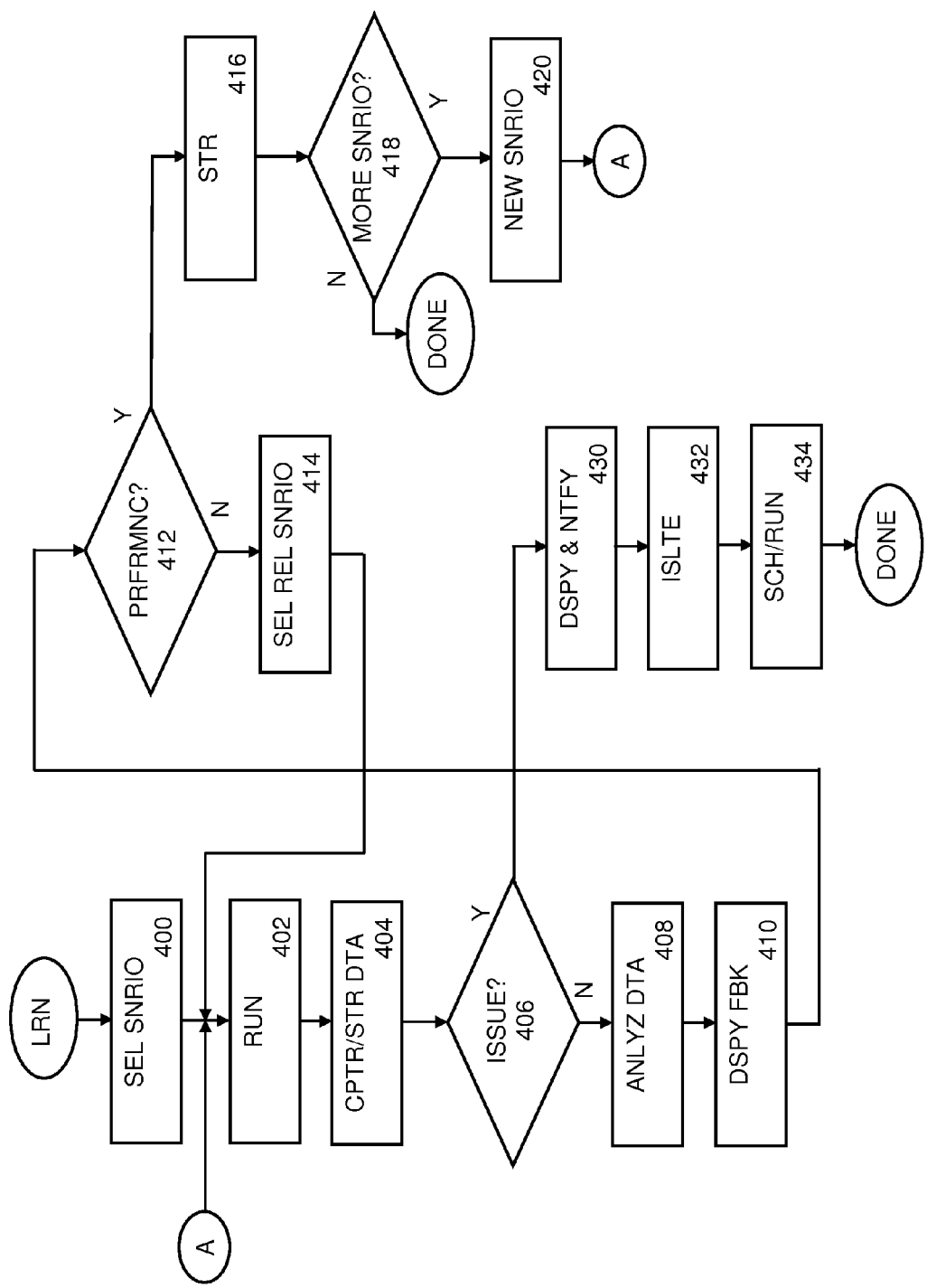
FIG. 11 illustrates a flow chart of the adaptive training system.

Referring to FIG. 11, a flow chart of the adaptive training system is shown. Typically, a chapter or portion of a training course (courseware 110) is presented in one session to the trainee 5. The methods disclosed monitory the demonstrated abilities (or lack thereof) of the trainee 5 and adapt the training course to such. In this, a first scenario/segment from the chapter is selected 400 then run 402. Data is captured 404 during and/or after the scenario/segment is run. An example of a simple scenario/segment is a simulation of driving down a road way, approaching an unmarked intersection and a vehicle pulls out from the intersection into the path of the trainee 5. If the captured data indicates a major issue occurred 406 such as the trainee 5 didn't apply the brakes, records are made and the appropriate training personnel are notified 430. In some situations in which a major issue occurred 406, the driver is notified on one or more of the displays 12/14/16, preferably the information display 16. As part of the adaptive process, elements that led up to the major issue are isolated/determined 432 and, as necessary, prior scenarios/segments or chapters are presented 434 to the trainee 5 to fortify the trainee's abilities on these elements. For example, if the trainee 5 didn't apply the brakes correctly because the trainee 5 was having trouble downshifting, then the scenarios/segments or chapters related to double clutching are scheduled to be repeated for that trainee 5 or are selected and run.

If no major issue is identified 406, the data is analyzed 408 to determine the performance of the trainee 5 in the given scenario/segment meets passing requirements and information is displayed 410 to the trainee 5 on one or more of the display devices 12/14/16. If the performance indicates that the trainee 5 didn't perform the task sufficiently 412, a new scenario/segment is selected 414. The new scenario/segment is selected 414 based upon elements of the prior scenario/segment that were not adequately performed. Since the method is adaptive, the method uses any existing or modified scenario/segment to fortify the element that was not adequately performed. For example, if the trainee 5 avoided the collision but the trainee 5 didn't step on the clutch while applying the brakes, therefore stalling the engine, one or more scenarios/segments or chapters related to proper use of the clutch while braking are selected 414 to be presented to the trainee 5 either during the current session or during a future session.

If the trainee's 5 performance meets passing requirements 412, the data (e.g. results) are stored 416 for later reporting/analysis/grading and it is determined if there are more scenarios/segments 418 for the trainee 5 (e.g. scenarios/segments are often grouped in chapters and the trainee 5 is finished when he/she complete a chapter, etc). If there are more scenarios/segments 418, the next scenario/segment is retrieved 420 and the above steps 402-418 are repeated until there are no more scenarios/segments planned for the trainee 5.

The methods of the prior art do not adapt to the trainee's 5 demonstrated abilities, running scenarios/segments sequentially, independent of any progress that the trainee 5 has made. For example, in a set of scenarios/segments are crafted to teach defensive driving, each presenting offending vehicles moving into the path of the trainee 5, if the trainee 5 demonstrates excellent responses to each of the first few scenarios/segments, the latter scenarios/segments are still presented, often boring the trainee 5. Similarly, if the trainee 5 shows a weakness in a certain operation such as double-clutching, the prior art would only repeat the scenarios/segments until the trainee 5 is able to pass that segment. In the later situation, it is desirable to access other scenarios/segments that may have already been completed for extra training on the operation of which the trainee 5 is having difficulty. The prior art does not address such operation to adapt to the demonstrated abilities of the trainee 5. The present invention addresses these and other shortcomings of the prior art through adapting to the trainee's 5 demonstrated abilities to determine which segments/scenarios need to be presented or re-presented next or in the future. In some embodiments, the segments/scenarios are marked for review to be re-presented during another session. In some embodiments, the data is stored and the next time the trainee 5 accesses the training system 10, the training system 10 analyzes the data to determine the more meaningful segments/scenarios that need be run to concentrate on areas that are the weakest, etc.

Referring to FIG. 12, a schematic view of a typical computer 100 is shown. The example computer 100 represents a typical computer system used as the heart of the training system 10. The example computer 100 is shown in its simplest form, having a single processor. Many different computer architectures are known that accomplish similar results in a similar fashion and the present invention is not limited in any way to any particular computer system. The present invention works well utilizing a single processor system, a multiple processor system where multiple processors share resources such as memory and storage, a multiple server system where several independent servers operate in parallel (perhaps having shared access to the data or any combination). In this, a processor 610 is provided to execute stored programs that are generally stored for execution within a memory 620. The processor 610 can be any processor or a group of processors, for example an Intel Pentium-4® CPU or the like. The memory 620 is connected to the processor in a way known in the industry such as by a memory bus 615 and is any memory 620 suitable for use with the selected processor 610, such as SRAM, DRAM, SDRAM, RDRAM, DDR, DDR-2, flash, FEROM, etc.

Also connected to the processor 610 is a system bus 630 for connecting to peripheral subsystems such as a network interface (not shown), a persistent storage (e.g. a hard disk, semiconductor storage such as flash, a raid system, etc) 640, a disk drive (e.g. DVD) 650, one or more graphics adapters 660, a keyboard/mouse 670 and/or one or more touch screen interfaces 675. The graphics adapter(s) 660 receives commands and display information from the system bus 630 and generates a display image that is displayed on one or more of the graphic display devices 12/14/16/42/43/44.

In general, the hard disk 640 may be used to store programs, executable code and data (e.g. courseware 110 and user data 120) persistently. For data security and reliability, in some embodiments, the hard disk 640 is multiple disks or a raid system, etc. The removable disk drive 650 is often used to load CD/DVD/Blu-ray disks having programs, executable code and data onto the hard disk 640. These peripherals are examples of input/output devices, persistent storage and removable media storage. Other examples of persistent storage include core memory, FRAM, flash memory, etc. Other examples of removable disk drives 650 include CDRW, DVD, DVD writeable, Blu-ray, compact flash, other removable flash media, floppy disk, etc. In some embodiments, other devices are connected to the system through the system bus 630 or with other input-output connections. Examples of these devices include printers; graphics tablets; joysticks; audio components; and communications adapters such as modems and Ethernet adapters.

Although there are many ways anticipated for connecting training system components 13/30/32/34/36/106/9/118/123 to the processor, one preferred interface is a bi-directional local area network such as Car Area Network (CAN) 685 connected to the bus 630 by a Car Area Network (CAN) interface 680 as known in the industry. Any connection scheme to the system components 13/30/32/34/36/106/9/118/123 is anticipated including direct wiring, any local area network (e.g. Ethernet, CAN or VAN) and wireless (e.g. BlueTooth).

In embodiments having array sensors 9/13, information from the array sensors 9/13 is read by the processor 610 and analyzed to provide various data such as the position of the trainee's head, the location of the trainee's head, the location of the trainee's hands/arms, the facial expressions of the trainee 5, the body temperature of the trainee's body, the pulse rate of the trainee's heart, etc.

Figure 15:
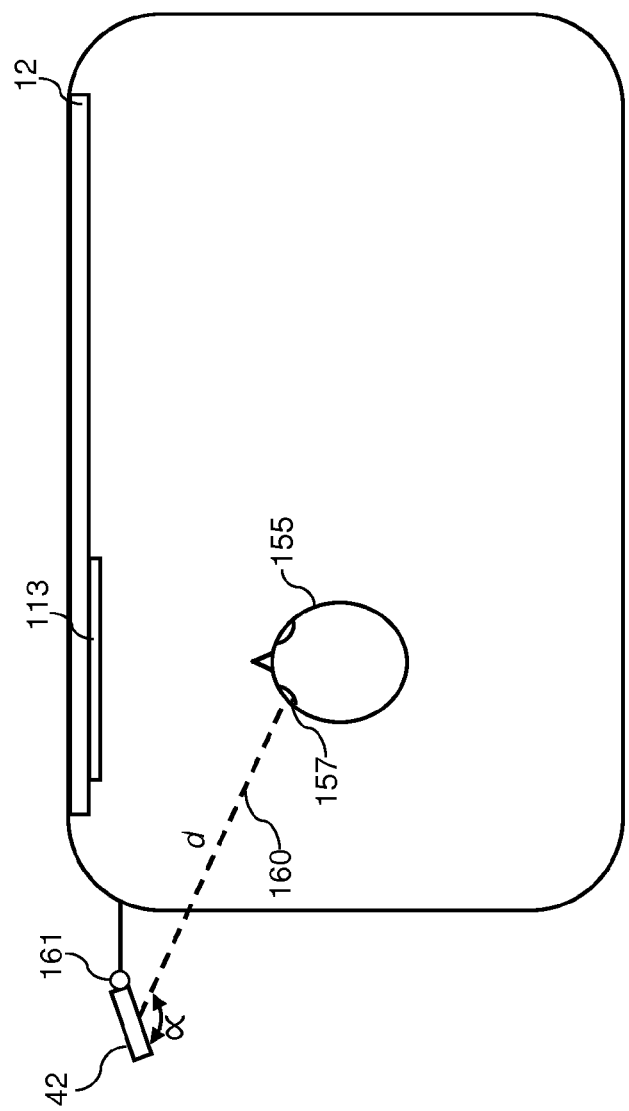
FIG. 15 illustrates a schematic view of a simulated vehicle cabin 11 from above.
Figure 16:
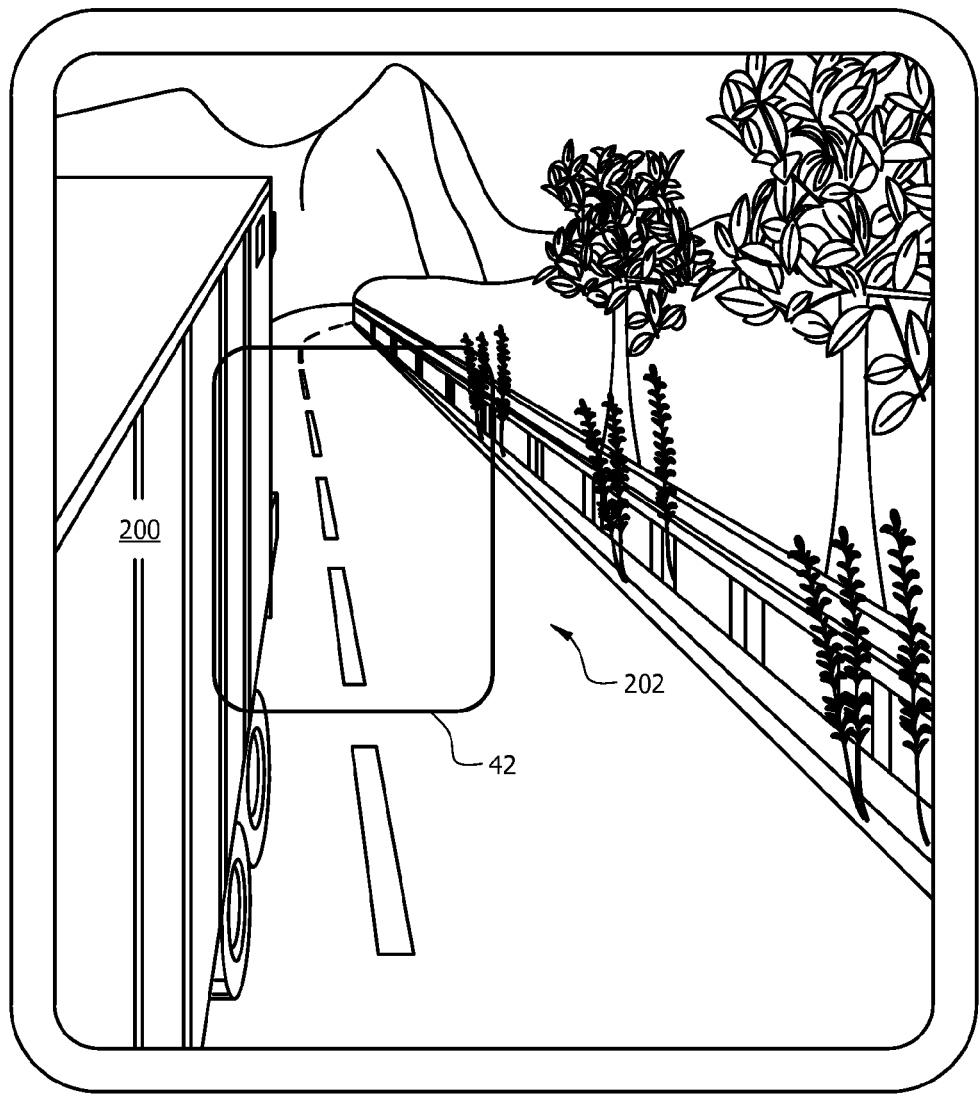
FIGS. 16-22 illustrate views displayed in a rear view mirror of the training system based upon various relationships between a trainee and the rear view mirror.
Figure 17:
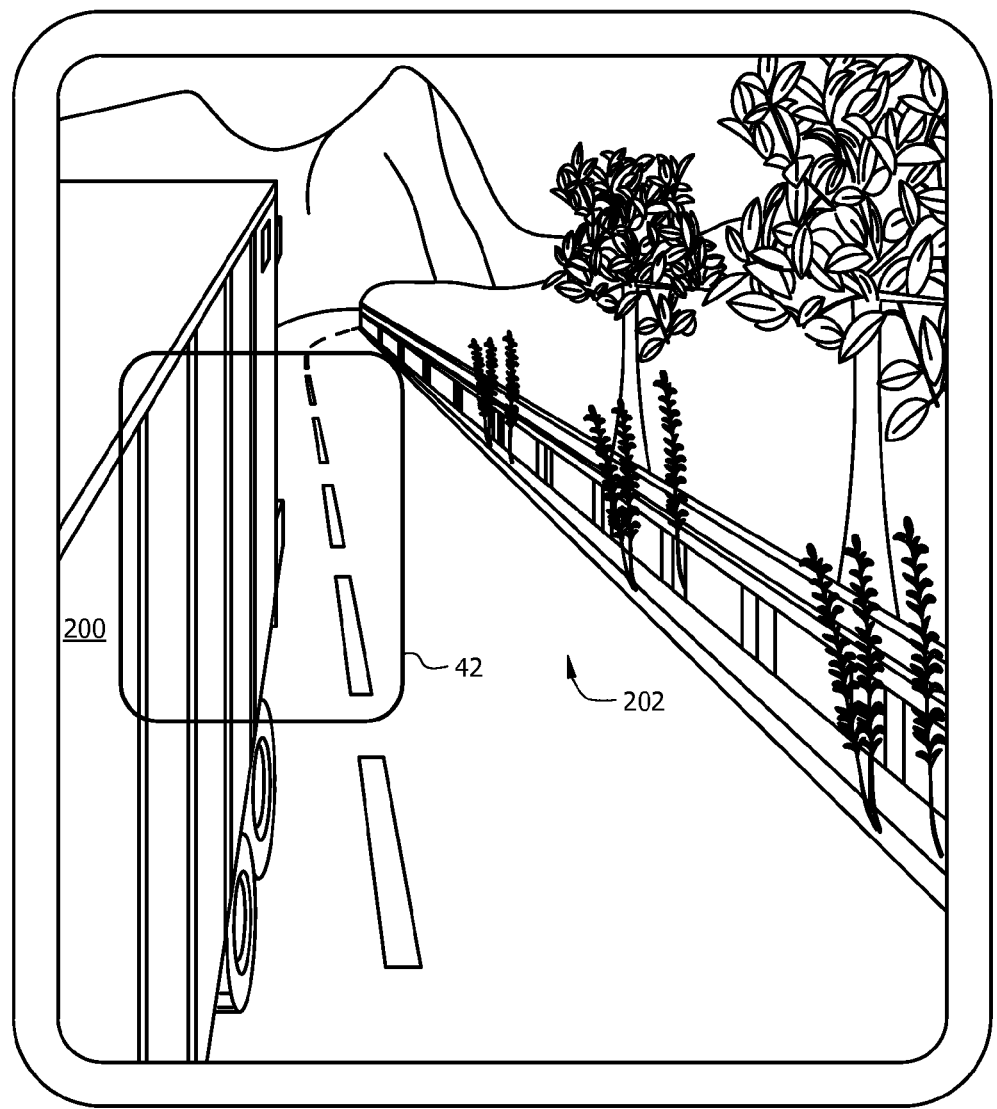
Figure 18:
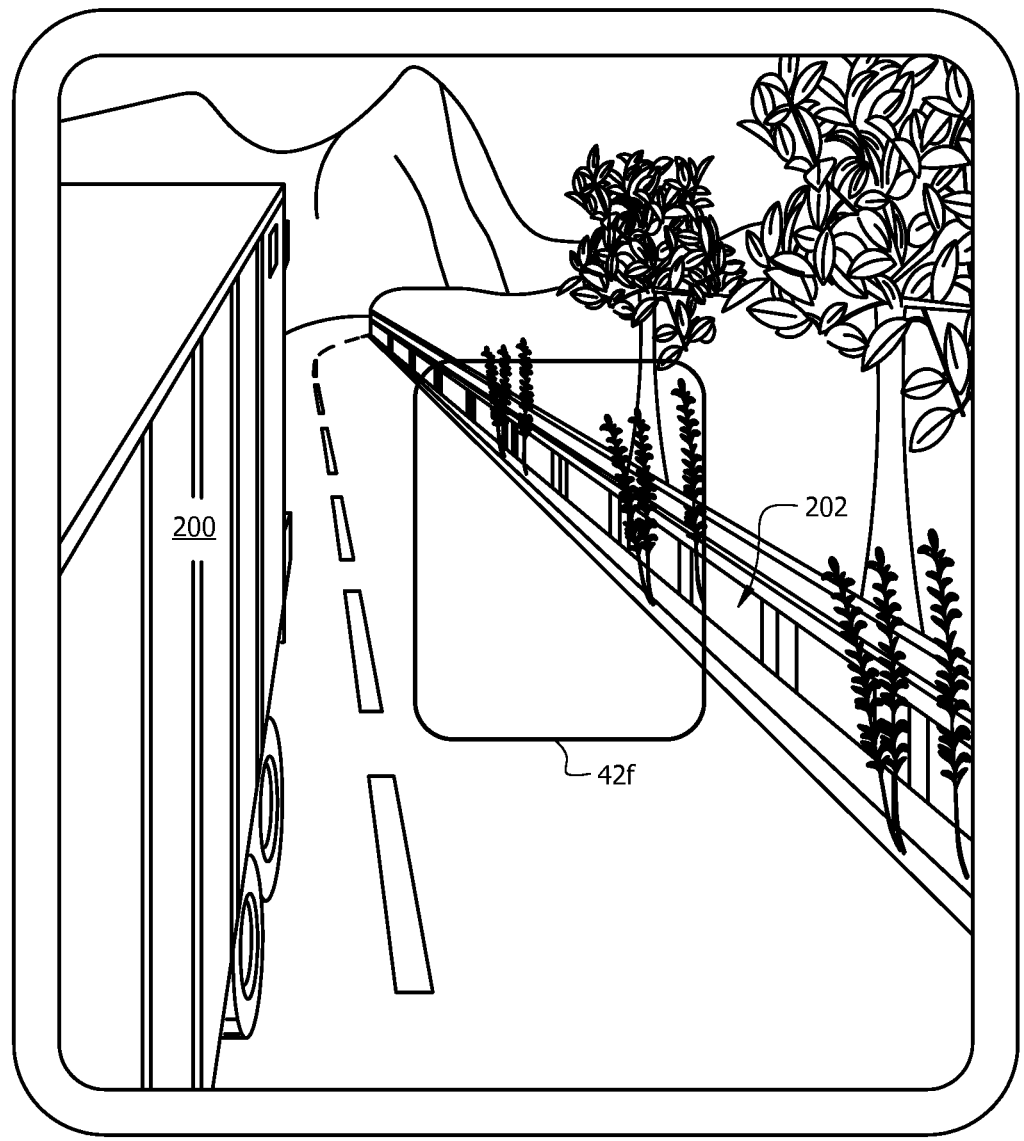
Figure 19:
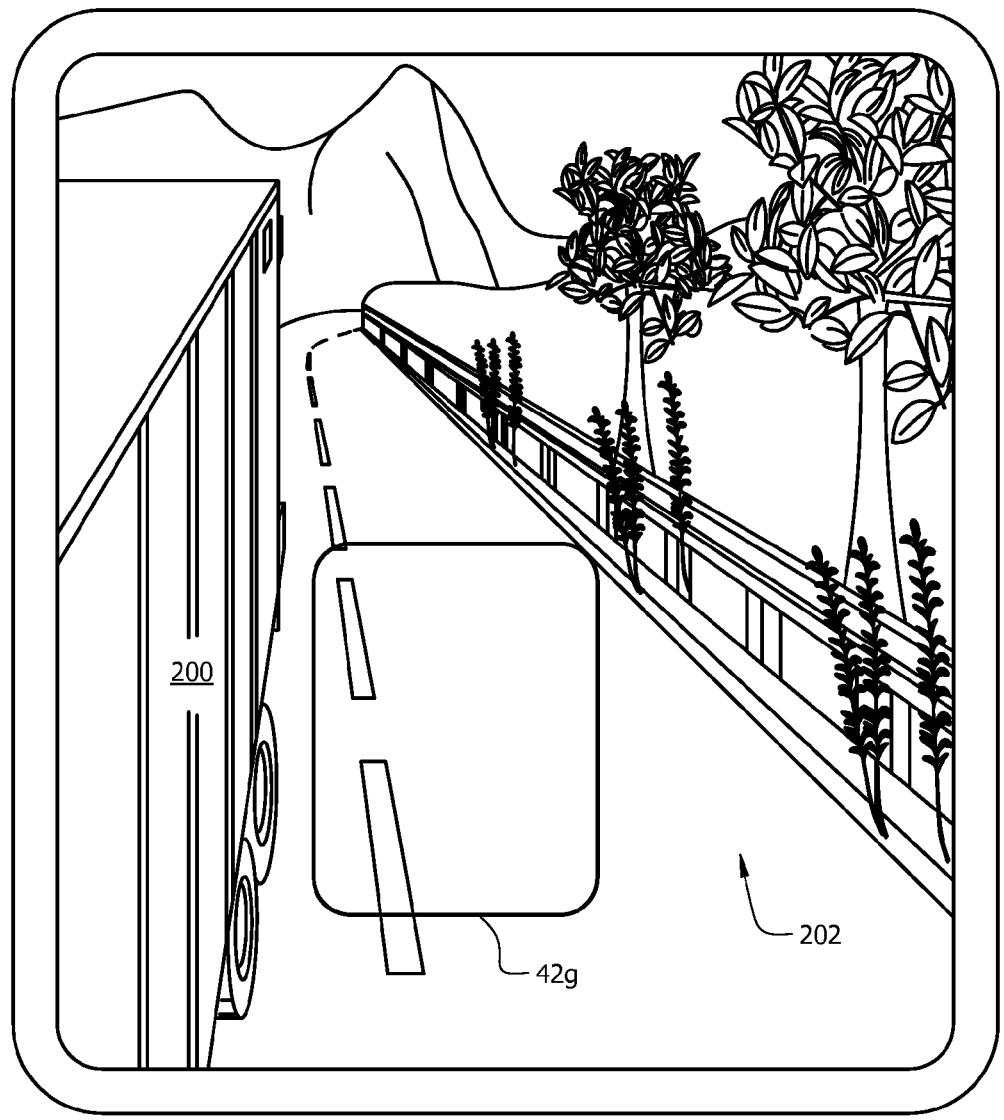
Figure 20:
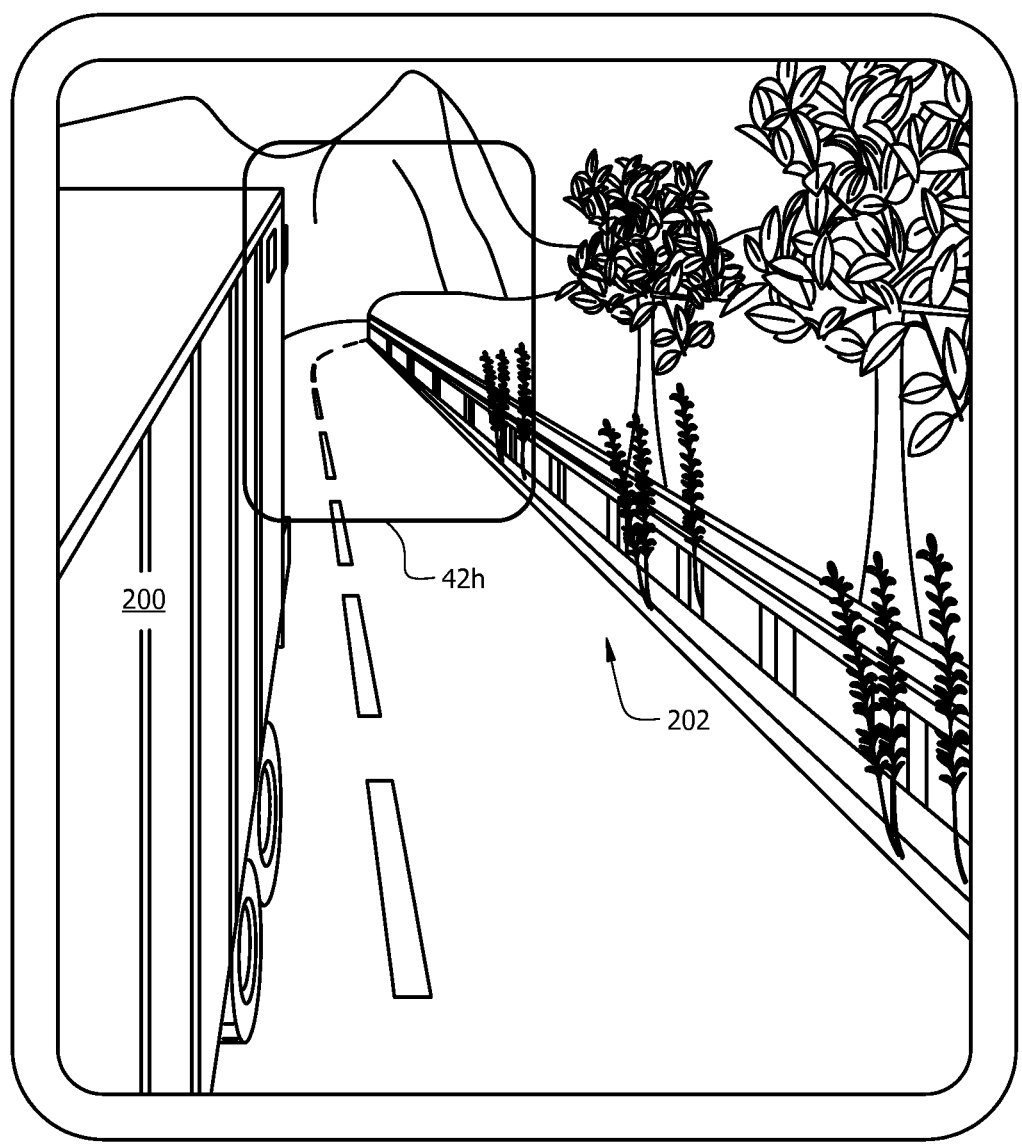

Referring to FIG. 15, a schematic view of a simulated vehicle cabin 11 from above. Although the shape and spatial arrangements of the simulation cabin 11 shown in FIG. 15 typically depicts a truck cab, any size and shape of cabin is anticipated and the simulation cabin 11 shown is for example purposes.

In this example, the simulation cabin 11 includes a display 12 and a discrete driver-side rear view mirror 42 (only one shown for simplicity). Also in this example, the simulation cabin 11 includes a sensor array 9/13 mounted above the display 12, although any suitable mounting location is anticipated. As discussed prior, any number of rear view mirrors 42/42a/43/44/44a are anticipated, either discrete rear view mirrors 42/43/44 and/or rear view mirrors 42a/44a that are a reserved area of the display 12 (or any display in the system).

A simplified view of the relationship between the head 155 of a trainee 5 and eyes 157 of the trainee is shown. In this, a line of sight 160 is established between the trainee's eyes 157 and the rear view mirror 42. Note that the discrete rear view mirror 42 is shown slightly angled with respect to the plane of the display 12 (e.g. the simulated plane of the windshield of the vehicle) as would be expected in an actual vehicle. In a real vehicle, the angle of each rear view mirror 42/42a/43/44/44a is adjustable to compensate for the driver/trainee 5. It is fully anticipated that the discrete rear view mirrors 42/43/44 and/or displayed rear view mirrors 42a/44a are fully adjustable both horizontally and vertically to compensate for the trainee's height and sitting position.

For simplicity, the rear view mirror 42 is shown as a planar device, though use of concave or convex mirrors is anticipated. The training system 10 reads location data from the sensors 9/13 and calculates the location of the trainee's eyes 157 (e.g. Y and Z position). This location is used to determine the line-of-sight 160 distance, d, and horizontal reflection angle, $\alpha$, with respect to the rear view mirror 42. In some embodiments, the training systems 10 uses data from the sensor array 9/13 to determine a height position (e.g. Y) of the trainee's eyes 157. The height position (Y) is then used to calculate a vertical angle, $\theta$, representing the horizontal angle between the line of sight 160 and the rear view mirror 42. For example, as the trainee 5 positions their eyes 157 further to the left, the training system 10 calculates the horizontal reflection angle, $\alpha$, and adjusts the image displayed on the rear view mirror 42 to show rear view images that are closer to the simulated vehicle.

An example of the view displayed in a rear view mirror 42 of the training system 10, FIGS. 16-22 show a stored image 202 of a wide angle view of what is visible in the rear of the simulated vehicle 200 at a particular position in an environment (e.g. a snapshot of the rear view at a particular point of time in a forward motion video stream). At any given time, some or this entire image is displayed in the rear view mirror 42. To explain how the training system 10 operates, to start, the trainee 5 is positioned as in FIG. 15 and, using data from the sensor(s) 9/13, the distance from the rear view mirror 42, d, horizontal angle, $\alpha$, and vertical angle, $\theta$, are calculated. Based upon calculations of the distance, the horizontal angle, $\alpha$, and the vertical angle, $\theta$, the image area 42d is displayed in the rear view mirror 42 (e.g., showing what is next to the simulated vehicle 200). As the trainee 5 moves his/her head left (e.g., towards the driver-side window), the horizontal angle, $\alpha$, decreases and the image area 42e is displayed in the rear view mirror 42 (e.g., showing an area closer to the simulated vehicle 200). If, instead, the trainee 5 moves his/her head right (e.g., away from the driver-side window), the horizontal angle, $\alpha$, increases and the image area 42f is displayed in the rear view mirror 42 (e.g., showing an area further away from the simulated vehicle 200).

As the trainee 5 moves his/her head up (e.g., towards the roof of the simulated cabin), the vertical angle, $\theta$, decreases and the image area 42g is displayed in the rear view mirror 42 (e.g., showing an area downward with relationship to the simulated vehicle 200). If, instead, the trainee 5 moves his/her head down (e.g., towards the floor of the simulated cabin), the vertical angle, $\theta$, increases and the image area 42h is displayed in the rear view mirror 42 (e.g., showing an area further away from the simulated vehicle 200).

Figure 21:
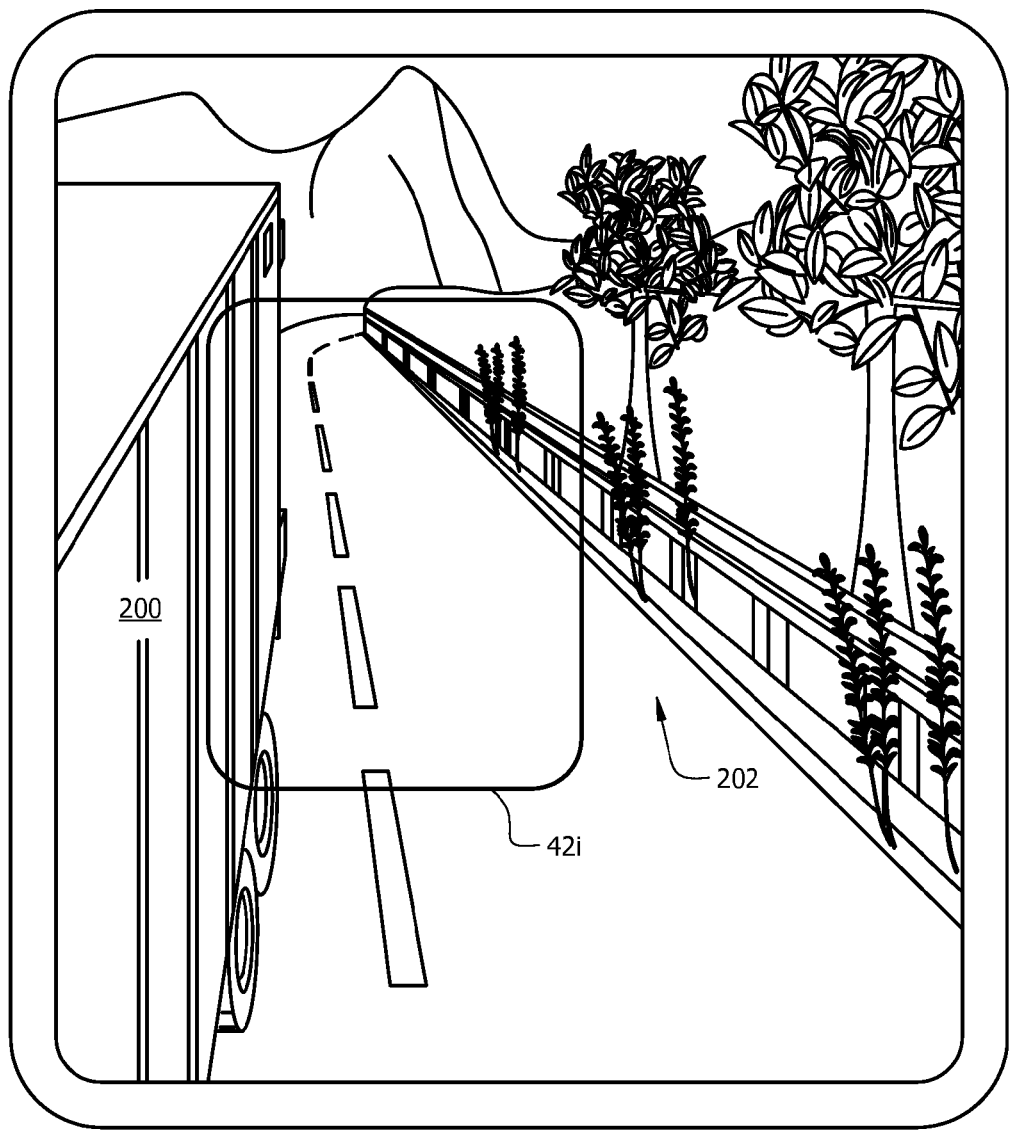
Figure 22:
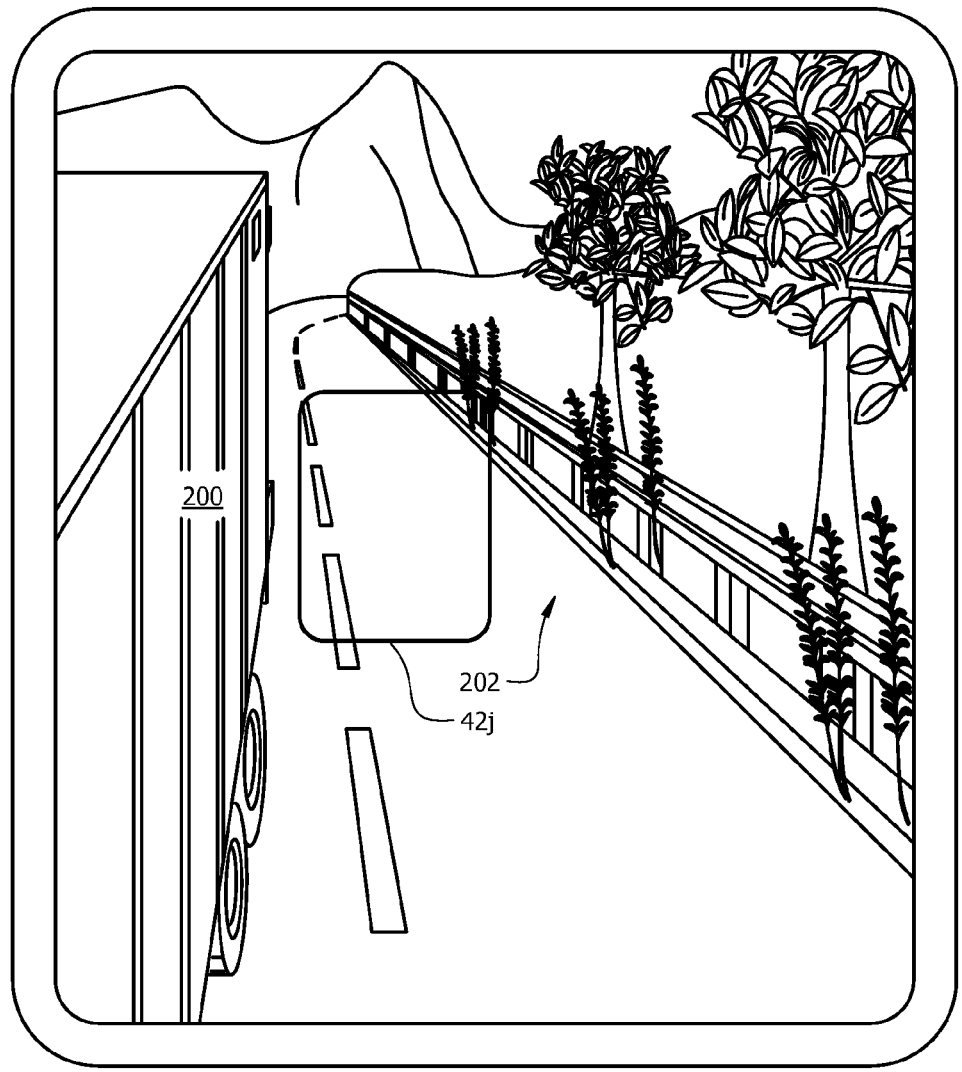

As the trainee 5 moves their eyes 157 closer to the rear view mirror 42, the distance, d, decreases and, responsive, the training system 10 zooms out, showing a greater portion of the stored image 202, for example the area 42i of the stored image 202 depicted in FIG. 21. As the trainee 5 moves their eyes 157 further away from the rear view mirror 42, the distance, d, increases and, responsive, the training system 10 zooms in, showing a smaller portion of the stored image 202, for example the area 42k of the stored image 202 depicted in FIG. 22.

It is well understood that the above are examples, and that the training system 10 utilizes as much positional data as is available from the array of sensors 9/13 to determine a two-dimensional or three-dimensional location of the eyes 157 of the trainee 5, then uses this data to determine what the trainee 5 should see in the rear view mirrors 42/42a/43/44/44a. Also, the above examples show a static rear view stored image 202 as occurs when the training system 10 is not simulating motion (e.g., the simulated vehicle is stopped). The same rear view mirror simulation is performed when the training system 10 is simulating motion, using a motion video stored image 202.

In some embodiments, the mirror(s) 42/42a/43/44/44a are adjustable by the trainee 5. For example, there is a control, for example on the dashboard 14 or other location on the cabinet 8, etc., or the mirror(s) 42a/44a are manually adjustable. In embodiments in which there is a control to adjust the mirror 42/42a/43/44/44a, as the control is operated, the image on the mirror 42/42a/43/44/44a pans within the stored image 202 as happens with actual mirrors. In some such embodiments with discrete mirrors 42a/42b, the mirror(s) 42a/42b change angle while the image pans to better simulate an actual mirror. In such, an actuator 161 moves the mirror(s) 42a/44a to change the angle. In some such embodiments with discrete mirrors 42a/42b, the trainee 5 physically changes the angle of the discrete mirrors 42a/42b. As the trainee 5 physically changes the angle of the discrete mirrors 42a/42b, the physical angle of the discrete mirrors 42a/42b is measured by a sensor 161 and the data from the sensor 161 is used to modify the horizontal angle, $\alpha$, and vertical angle, $\theta$, and, therefore, the panning within the stored image 202.

Figure 23:
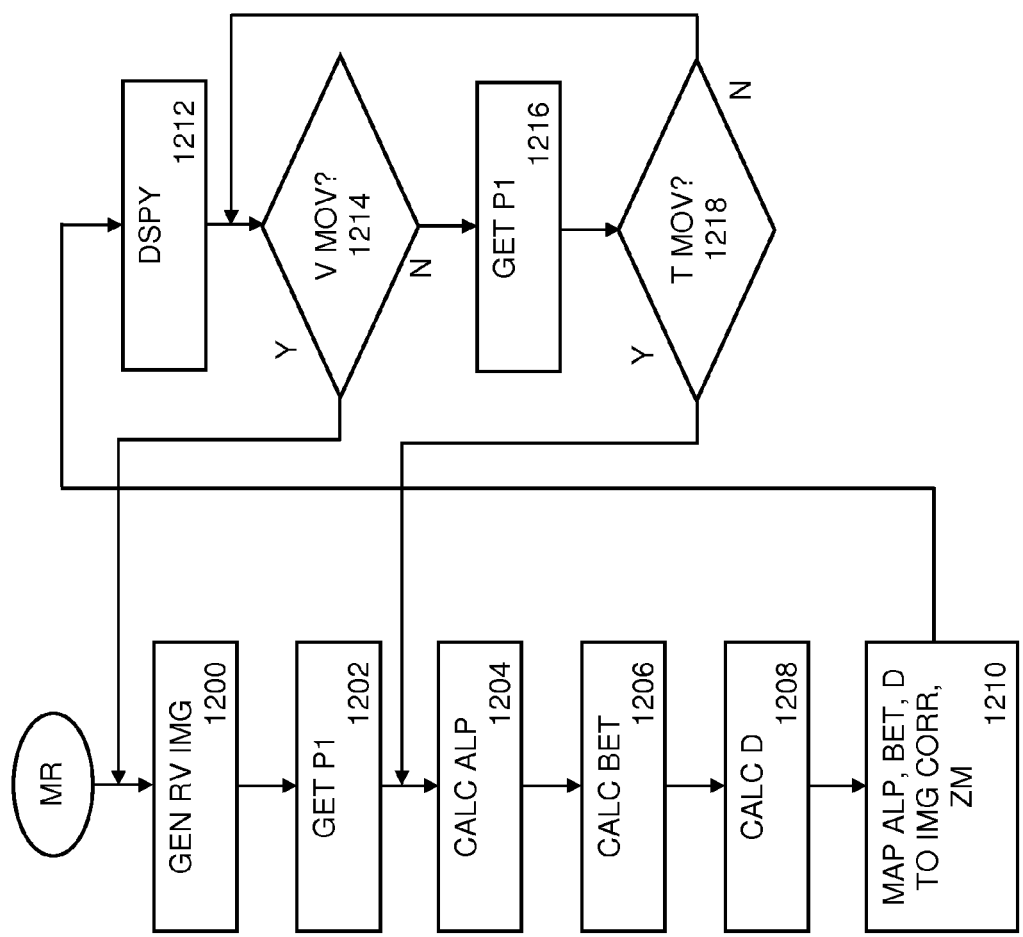
FIG. 23 illustrates a flow of an exemplary software program for rear view mirror simulation.

Referring to FIG. 23, a flow of an exemplary software program for rear view mirror simulation of the training system is shown. The steps start with generating 1200 a rear view image 202. This is performed in any way known in the industry, typically extracting a frame from an MPEG-2 video stream that depicts what is behind/next-to the simulated vehicle. Next, the position of the trainee 5 is determined 1202. This is performed by reading data from the sensor array 9/13 and calculated a 2-dimensional or 3-dimensional location of the trainee 5 with respect to the simulated cabin 11. From this data, the distance, d, is calculated 1208, the horizontal angle, α, is calculated 1204, and the vertical angle, θ, is calculated 1206. The distance, d, the horizontal angle, α, and the vertical angle, θ, are then used to map to a position and zoom value 1210 within the rear view image 202. The resulting portion of the rear view image 202 is then displayed 1212 on the corresponding mirror 42/42a/43/44/44a. If the simulated vehicle is moving 1214, then all of the steps are repeated from generating 1200 the rear view image 202. If not moving, then if the trainee 5 has moved 1218, then the existing rear view image 202 is used and the position and zoom value are recalculated and displayed starting with step 1204. If the trainee 5 has not moved 1218, then it is rechecked whether the simulated vehicle has moved in step 1214. These steps repeat throughout the training exercise. Similar steps are performed for each rear view mirror 42/42a/43/44/44a.

Figure 24:
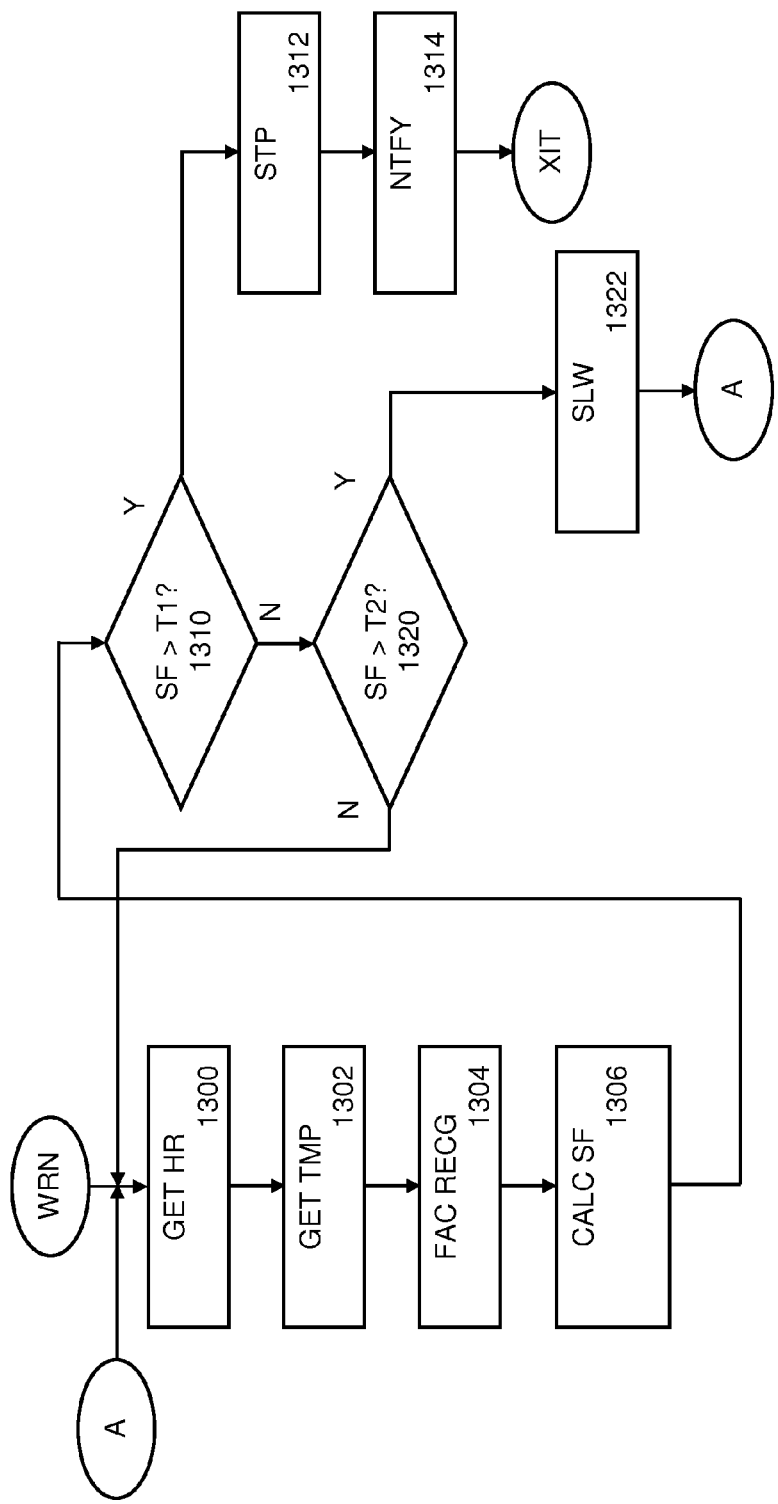
FIG. 24 illustrates a flow of an exemplary software program for stress detection of the trainee.

Referring to FIG. 24, a flow of an exemplary software program for stress detection is shown. The steps start with determining a stress factor of the trainee 5. This is performed by reading data from the sensor array 9/13 and calculating a heart rate (pulse) 1300 of the trainee 5, calculating or reading a temperature 1302 of the trainee 5, and/or determining the facial characteristics 1304 of the trainee 5. Any combination of data such as heart rate, pulse, facial recognition, skin moisture (sweating), vocal sounds (grunts, sighs), etc. are anticipated. The heart rate, pulse, facial recognition, skin moisture (sweating), vocal sounds (grunts, sighs) are used to calculate 1306 a stress factor. The higher the stress factor, the more stress the trainee 5 is exhibiting. For example, if the trainee 5 has a pulse rate of 102 and a temperature of 101, then their stress factor is higher than if the trainee has a pulse rate of 60 and a temperature of 98.6. It is anticipated that the system will normalize to a measured set of "at rest" measurements that are made prior to the simulation when the trainee 5 is calm, being that different people have different "at rest" heart rates, temperatures, facial expressions, etc.

The calculated stress factor is compared to one or more thresholds. For example, if the stress factor is greater than 1310 a first threshold, T1, (e.g. very high stress), the simulation is stopped 1312 and a trainer is notified 1314. Likewise, if the stress factor is not greater than 1310 the first threshold, T1, but is greater than a second threshold, T2, then the simulation is slowed 1322 and a new set of measurements made, repeating the above steps. Many different sets of actions are anticipated at each of various steps, including recording issues, notifying trainers, slowing the simulation, stopping the simulation, changing ambient conditions (e.g., air conditioning), etc. There are many way to determine the stress of the trainee 5 through measurements of various bodily functions and there is no limitation placed upon a particular method of detecting such stress and adjusting the simulation speed, intensity, etc., based upon the stress level. For example, in one embodiment, if the stress level is determined to be too low, additional simulation challenges are presented so as to reduce boredom, etc. Also, although generating an overall stress level measurement has been described; there is no requirement for generating such. For example, in alternate embodiments, the pulse rate is determined and the simulation adjusted based upon the pulse rate without combining the pulse rate with other measurements to determine stress level. For example, in this embodiment, it is anticipated that there is a maximum allowable pulse rate, at which the simulation is slowed, and eventually stopped, to reduce the risk of medical problems, etc. It is also anticipated that a trainer is notified. In some examples, if the symptoms are life threatening, one or more emergency responders are notified.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A training system, the training system providing training on operation of a vehicle to a trainee, the trainee seated in the training system, the training system comprising:
   a computer, the computer having a storage device;
   a plurality of training segments stored on the storage device and accessible by the computer;
   one or more graphics displays;
   a sensor, the sensor configured to measure at least one biological indicator of stress in the trainee;
   software running on the computer, the software presents the training segments to the trainee, simulating operation of the vehicle under control of the trainee through operator controls, the operator controls including at least a steering device, a shifting device, and a throttle, the steering device, the shifting device, and the throttle within the training system;
   the software reads data from the sensor and the software calculates a stress level of the trainee from the data;
   the software modifies operation of the training system based upon the stress level of the trainee; and
   if the stress level exceeds a predetermined threshold, the software notifies a trainer, the trainer being in the location of the training system.

2. The training system of claim 1, wherein the software modifies operation of the training system to increase difficulty based upon the stress level of the trainee being below a boredom threshold.

3. The training system of claim 1, wherein the software modifies operation of the training system to decrease difficulty based upon the stress level of the trainee being above a warning threshold.

4. The training system of claim 1, wherein the software modifies operation of the training system to decrease difficulty based upon the stress level of the trainee being above a severe threshold.

5. The training system of claim 4, wherein the software further notifies a trainer based upon the stress level of the trainee being above the severe threshold.

6. The training system of claim 1, wherein the data includes a heart rate of the trainee.

7. The training system of claim 1, wherein the data includes a body temperature of the trainee.

8. The training system of claim 1, wherein the data includes a facial expression of the trainee.

9. The training system of claim 1, wherein the data includes vocal sounds made by the trainee.

10. A method of training a trainee in use of a vehicle, the method using a training system having a computer that includes a storage device, the storage device having stored within a plurality of training segments; the training system including a sensor, the sensor configured to measure at least one biological indicator of stress in the trainee, the training system including a seat where the trainee sits during the simulation; the method includes:

(a) presenting one of the training segments on a monitor of the training system;

(a') monitoring inputs from the trainee, the inputs controlling the operation of the training system, the inputs from at least a steering mechanism, a throttle mechanism, and a shifting mechanism, the steering device, the shifting device, and the throttle within the training system;

(b) reading data from the sensor;

(c) determining a stress level of the trainee from the data;

(d) comparing the stress level to a pre-determined value;

(e) if the step of comparing indicates an abnormal stress level, initiating steps to alleviate the stress level, wherein the steps to alleviate the stress level include notifying a trainer, the trainer being in the location of the training system;

(f) repeating steps a-e.

11. The method of claim 10, wherein the steps to alleviate the stress level include slowing the presenting of the one of the training segments.

12. The method of claim 10, wherein the steps to alleviate the stress level include increasing a speed of the presenting of the one of the training segments.

13. The method of claim 10, wherein the steps to alleviate the stress level include stopping the presenting one of the training segments.

14. A system for training a trainee regarding the use of a vehicle the training system having a seat in which the trainee sits, the system comprising:

a computer;

a plurality of training segments accessible by the computer;

a display operatively interfaced to the computer;

means for receiving driving controls from the trainee, the driving controls received from at least a steering device, a shifting device, and a throttle;

means for displaying one or more of the training segments sequentially on the display to simulate operation of the vehicle, the one or more training segments changed responsive to the driving controls from the trainee;

at least one sensor, the at least one sensor configured to measure at least one biological indicator of stress in the trainee;

software running on the computer calculates a stress level of the trainee from the at least one sensor;

means for taking action based upon undesired stress levels, the means for taking action including at least notifying a trainer if the stress level of the trainee exceeds a predetermined value.

15. The system for training a trainee regarding the use of a vehicle of claim 14, wherein the means for taking action includes slowing the displaying one or more of the training segments.

16. The system for training a trainee regarding the use of a vehicle of claim 14, wherein the means for taking action includes increasing a speed of the displaying one or more of the training segments.

17. The system for training a trainee regarding the use of a vehicle of claim 14, wherein the means for taking action includes stopping of the displaying one or more of the training segments.

* * * * *